US009288511B2

(12) United States Patent
Lin et al.

(10) Patent No.: US 9,288,511 B2
(45) Date of Patent: *Mar. 15, 2016

(54) METHODS AND APPARATUS FOR MEDIA NAVIGATION

(75) Inventors: Kui Lin, Redwood City, CA (US); Hong Heather Yu, West Windsor, NJ (US)

(73) Assignee: Futurewei Technologies, Inc., Plano, TX (US)

(*) Notice: Subject to any disclaimer, the term of this patent is extended or adjusted under 35 U.S.C. 154(b) by 964 days.

This patent is subject to a terminal disclaimer.

(21) Appl. No.: 13/398,682

(22) Filed: Feb. 16, 2012

(65) Prior Publication Data

US 2012/0216121 A1    Aug. 23, 2012

Related U.S. Application Data

(60) Provisional application No. 61/444,570, filed on Feb. 18, 2011.

(51) Int. Cl.
*G06F 3/00* (2006.01)
*G06F 15/16* (2006.01)
(Continued)

(52) U.S. Cl.
CPC ..... *H04N 21/234327* (2013.01); *H04N 21/235* (2013.01); *H04N 21/251* (2013.01); *H04N 21/2665* (2013.01); *H04N 21/4316* (2013.01); *H04N 21/4725* (2013.01);
(Continued)

(58) Field of Classification Search
CPC .......... H04N 5/44543; H04N 21/8456; H04N 21/4728; H04N 21/6582; H04N 21/4725; H04N 21/235; H04N 21/234327; H04N 21/8133; H04N 21/6543; H04N 21/8455; H04N 21/25891; H04N 21/47217; H04N 21/84; H04N 21/8543; H04N 21/4316; H04N 21/251; H04N 21/6587; H04N 21/4622; H04N 21/2665; H04N 21/8583; G11B 27/34; G11B 27/10; G11B 27/034
USPC .......................... 715/716, 719, 720, 723–726
See application file for complete search history.

(56) References Cited

U.S. PATENT DOCUMENTS 5,635,982 A    6/1997    Zhang et al.
6,252,975 B1   6/2001    Bozdagi et al.
(Continued)

OTHER PUBLICATIONS

Guillemot, M., et al., "A Hierarchical Keyframe User Interface for Browsing Video over the Internet," Proceedings of the ninth IFIP TC13 international conference on Human-Computer Interaction, Sep. 2003, 4 pages, Zurich, Switzerland.
(Continued)

*Primary Examiner* — Kieu Vu
*Assistant Examiner* — Asteway T Gattew
(74) *Attorney, Agent, or Firm* — Slater & Matsil, L.L.P.

(57) ABSTRACT

In accordance with an embodiment of the present invention, an apparatus for streaming a media includes a server side receiver for receiving a request to stream a media from a media player. The apparatus further includes a content generator, a server side transmitter, and a media stream generator. The content generator is configured to generate content information providing a plurality of presentation options to consume the media. The server side transmitter is configured to send the content information. The server side receiver is further configured to receive a selected presentation option from amongst the plurality of presentation options. The media stream generator is configured to generate a media stream comprising the media based on the selected presentation option.

30 Claims, 13 Drawing Sheets

(51) Int. Cl.
    *H04N 21/2343*   (2011.01)
    *H04N 21/235*   (2011.01)
    *H04N 21/25*   (2011.01)
    *H04N 21/2665*   (2011.01)
    *H04N 21/431*   (2011.01)
    *H04N 21/472*   (2011.01)
    *H04N 21/4725*   (2011.01)
    *H04N 21/4728*   (2011.01)
    *H04N 21/6543*   (2011.01)
    *H04N 21/6587*   (2011.01)
    *H04N 21/81*   (2011.01)
    *H04N 21/84*   (2011.01)
    *H04N 21/8543*   (2011.01)
    *H04N 21/858*   (2011.01)
    *H04N 21/258*   (2011.01)
    *H04N 21/462*   (2011.01)
    *H04N 21/658*   (2011.01)
    *H04N 21/845*   (2011.01)

(52) U.S. Cl.
    CPC .... *H04N 21/4728* (2013.01); *H04N 21/47217* (2013.01); *H04N 21/6543* (2013.01); *H04N 21/6587* (2013.01); *H04N 21/8133* (2013.01); *H04N 21/84* (2013.01); *H04N 21/8543* (2013.01); *H04N 21/8583* (2013.01); *H04N 21/25891* (2013.01); *H04N 21/4622* (2013.01); *H04N 21/6582* (2013.01); *H04N 21/8455* (2013.01); *H04N 21/8456* (2013.01)

(56) References Cited

U.S. PATENT DOCUMENTS

| | | | |
|---|---|---|---|
| 6,340,971 B1 | 1/2002 | Janse et al. | |
| 6,366,296 B1 | 4/2002 | Boreczky et al. | |
| 6,393,054 B1 | 5/2002 | Altunbasak et al. | |
| 6,453,471 B1 | 9/2002 | Klosterman | |
| 6,711,587 B1 | 3/2004 | Dufaux | |
| 6,718,117 B1 | 4/2004 | Rijckaert et al. | |
| 6,782,049 B1 | 8/2004 | Dufaux et al. | |
| 7,418,192 B2 | 8/2008 | Gutta et al. | |
| 7,558,760 B2 | 7/2009 | Fang et al. | |
| 7,853,972 B2 | 12/2010 | Brodersen et al. | |
| 7,930,419 B2 | 4/2011 | Mullig et al. | |
| 7,984,385 B2 | 7/2011 | Ubillos | |
| 2001/0030660 A1 | 10/2001 | Zainoulline | |
| 2002/0133247 A1* | 9/2002 | Smith et al. | 700/94 |
| 2005/0028221 A1* | 2/2005 | Liu et al. | 725/133 |
| 2007/0016611 A1 | 1/2007 | Wang | |
| 2007/0203945 A1 | 8/2007 | Louw | |
| 2008/0155413 A1 | 6/2008 | Ubillos | |
| 2008/0155421 A1 | 6/2008 | Ubillos et al. | |
| 2008/0216020 A1 | 9/2008 | Plummer | |
| 2008/0263448 A1 | 10/2008 | Oppenheimer | |
| 2009/0037817 A1 | 2/2009 | Bennetts et al. | |
| 2010/0122166 A1 | 5/2010 | Chien et al. | |
| 2010/0235744 A1 | 9/2010 | Schultz et al. | |
| 2010/0303440 A1 | 12/2010 | Lin et al. | |
| 2010/0332497 A1 | 12/2010 | Valliani et al. | |
| 2011/0191679 A1 | 8/2011 | Lin et al. | |
| 2012/0070129 A1* | 3/2012 | Lin et al. | 386/278 |

OTHER PUBLICATIONS

Komlodi, A., et al., "Key frame preview techniques for video browsing," Proceedings of International Conference on Digital Libraries, 1998, pp. 118-125, Pittsburgh, PA.

Office Action for U.S. Appl. No. 13/398,610, Notification Date Jan. 14, 2014, 17 pages.

* cited by examiner

METHODS AND APPARATUS FOR MEDIA NAVIGATION

This application claims the benefit of U.S. Provisional Application No. 61/444,570, filed on Feb. 18, 2011, which application is hereby incorporated herein by reference.

CROSS-REFERENCE TO RELATED APPLICATIONS

This application relates to the following co-pending and commonly assigned patent applications: Ser. No. 13/398,610, filed Feb. 16, 2012, entitled "Methods and Apparatus for Media Navigation," which application is hereby incorporated herein by reference.

TECHNICAL FIELD

The present invention relates generally to media navigation, and more particularly to methods and apparatus for media navigation.

BACKGROUND

In recent years, media consumption has dramatically increased. This has resulted in a rapid increase in available media content. Consequently, consumers of the media have to select from a large array of available media content. However, there is no easy mechanism for making this selection.

Consumers of textual data have a much better experience than media consumers due to the availability of summaries, snippets, keywords, etc. For example, short summaries of large textual content provide users with an abstract of the content. This allows the user to rapidly select the articles/web pages to read.

In contrast, media consumers have to sort through the actual footage of the media before selecting a suitable media (or a portion of the media) to watch. For example, in a typical media player, a consumer must use the forward button to play the media stream at a faster frame rate, which mutes the audio channel. Further, the user may want to watch only a certain portion of the media stream, e.g., the financial summary in a news feed so that he can judge whether the financial news is worth watching. However, the user is likely to be frustrated because of the difficulty in identifying the appropriate relevant portion(s) of the media stream and the level of necessity (such as the level of desirability or urgency) to watch the media stream to get the needed summary. Such ineffective means introduce inefficiencies in media selection and effective consumption, and therefore, result in a degraded user experience.

In other words, consumers of media would like to control if, when, and how to watch media. For example, consumers would like to decide how to watch the media once consumption starts (temporal, special navigation, etc. to navigate to most wanted portions of the video content).

SUMMARY OF THE INVENTION

These and other problems are generally solved or circumvented, and technical advantages are generally achieved, by illustrative embodiments of the present invention.

In accordance with an embodiment of the present invention, a method of playing a media comprises receiving content information that provides a plurality of options to consume the media, and displaying the content information of a media player. A request to stream the media is sent based on one option selected from the plurality of options. A first media stream is received and displayed in accordance with the selected option.

In accordance with an embodiment of the present invention, a method of displaying a media comprises receiving a request to stream a media and generating content information providing a plurality of presentation options to consume the media. Content information is sent and a selected presentation option is received from amongst the plurality of presentation options. A first media stream comprising the media based on the selected presentation option is generated.

In accordance with an embodiment of the present invention, an apparatus for playing a media comprises a receiver configured to receive content information that provides a plurality of options to consume the media. The apparatus further includes a display and a transmitter. The display is configured to display the received content information. The transmitter sends a request to stream the media based on one option selected from the plurality of options. In various embodiments, the receiver is configured to receive a media stream in accordance with the selected option which is then displayed at the display.

In accordance with an embodiment of the present invention, an apparatus for streaming a media comprises a server side receiver for receiving a request to stream a media from a media player. The apparatus further includes a content generator, a server side transmitter, and a media stream generator. The content generator is configured to generate content information providing a plurality of presentation options to consume the media. The server side transmitter is configured to send the content information. The server side receiver is further configured to receive a selected presentation option from amongst the plurality of presentation options. The media stream generator is configured to generate a media stream comprising the media based on the selected presentation option.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 1, which includes FIGS. 1A-1C, describes a system for generating, delivering, and rendering the navigational media in various embodiments of the invention, wherein

FIG. 5, which includes

FIG. 7, which includes

FIG. 11, which includes FIGS. 11A and 11B, illustrates operations within a media rendering engine (MRE) in accordance with embodiments of the invention, wherein FIG. 11A illustrates the embodiment where the descriptor data stream is received by the MRE, and wherein FIG. 11B illustrates the embodiment where the descriptors are maintained at a server;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1A:
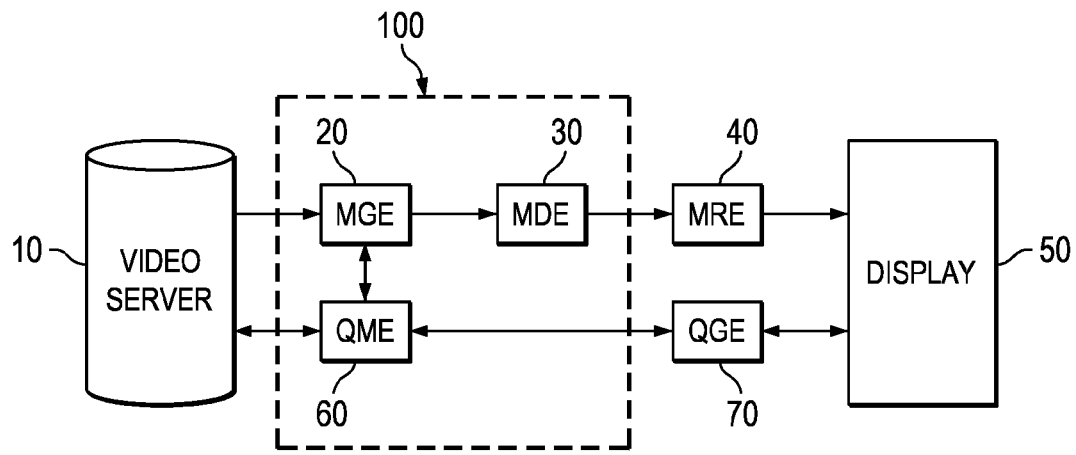
FIG. 1A illustrates the overall architecture.

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

From the early days of computing, information searching and browsing have been fundamental functionality requirements in almost all Internet application domains. Today, video traffic is growing at an astonishing rate. According to one estimate, by 2014, video will account for over 90% of the internet traffic with an estimated annual growth rate of about 46%.

Thus, video consumption has become part of our life for entertainment, education, and business. Conventional video consumption focuses mainly on video playback and related functions. An end user may watch the video in its designated speed or browse the video using video cassette recorder (VCR) like functions, such as 2× speed fast forward or rewind. A user may also pause the video and examine the content of that specific frame of the video in more details. However, the user is not provided with any further functionality.

In the Internet video domain, new video consumption methods have been invented to enhance end user experiences. For instance, rich media is widely adopted as a format to enhance the video consumption. In rich media, timed textual data and other types of media associated with the video may be displayed along with the video. As an example, in the typical online media platforms or delivery systems today, on-demand media content (especially video) is presented via media players which allow the users to pause a media stream, and randomly move to any spot within the media. Therefore, the media content is consumed either linearly (by default, for example, by clicking a web thumbnail which leads to a media playing in a media player) or randomly by the end user by dragging the play-head of the media player forward or backward to a random spot.

These types of media consumption models do not provide the end users effective consumption of media content. The random drag (scrub) of play-head may appear to provide infinite flexibility to the end users, but in fact the dragging to a spot involves random guess work and users often have to watch the content for a little bit to decide if this is worth continuing or another random drag is in order. Unless the video or a part of the video is cached in the player local buffer, each drag involves reestablishing network connection, sending anew request, and waiting for response from the streaming server. This process usually has a delay of a few seconds, the length of the delay depends on the connection bandwidth.

Consequently, the consumption method for video information remains primitive because video is still treated as a 'black box' due to the lack of description information regarding the contents of the video. As a result, finding efficient navigation methods to help users browse/search through the vast amount of video data and/or quickly find the specific information they are looking for remains a key challenge.

One way to resolve this problem may be the use of previews. A preview is a natural tool for people to sample the content of a video before watching it. However, providing large amount of preview data can take up considerable network delivery resources. To control the consumption of delivery resources, e.g., the delivery network bandwidth consumption, the preview delivery service are limited to the network condition, resource availability, as well as service capabilities. However, such brute force restriction of preview content degrades experience for all customers.

Further, previews offer only limited user flexibility. For example, some consumers may want to watch only some sections of the media. For instance, a consumer may want to watch all the financial news or the weather news from within a long media clip including other types of news. Identifying the locations of each such news of interest and then playing the same can be time consuming and may eventually frustrate the consumer. Even if the location of the news of interest within the media can be identified, the user still has to take many steps, i.e., repeatedly click (each with a delay) from one portion of the media to another thereby degrading the user experience.

In various embodiments, the present invention discloses a system, device, and methods of experiencing media that allow users to identify and consume portions of a media as well as consume related media. Embodiments of the present invention provide a richer user experience far beyond than possible using various preview schemes. The proposed scheme as described in various embodiments further improve user experiences, service personalization capability, as well as improve other service capabilities.

The navigation scheme as described in various embodiments below is scalable, flexible and extensible. Consequently, the navigation scheme may be implemented in a mobile network or other networks with limited bandwidth or networks with frequent bandwidth fluctuations or with excessive delays at users drag play-head from one spot to another.

Embodiments of the present invention enable end users to dive into the content of a visual data through contextual, spatial, and temporal navigation and browse through the content in a more efficient way to identify and play the portions of the media that interest them. For example, media players of users can find/identify sections of a media that interest the user, which is otherwise not possible.

Embodiments of the invention may take advantage of reference information about how the content has been consumed by various groups of consumers. For example, embodiments of the invention allow users to identify portions of the media that have been most popular within a certain group. A group may be based on any preset or user identified property such as geography, ethnicity, social affiliation, friends, etc.

Embodiments of the invention may adjust the viewing pattern so as to maximize the time the users are willing to invest or to maximize the value derivable from the video by users with least amount of time investment. In various embodiments, users may interact with the content so as to maximize the value of the content beyond the traditional one-way information exchange (i.e., playing back and watching).

A system for generating contextual navigable media will be described using FIG. 1, and alternatively using FIG. 15. Details of the components of the system will be described using FIGS. 8-13. FIGS. 2-4 and FIGS. 7-8 will be used to describe the navigable features as presented to the user in various embodiments of the invention. Various methods of implementing the embodiments of invention will be described using FIGS. 5, 9, 11-14.

Figure 1B:
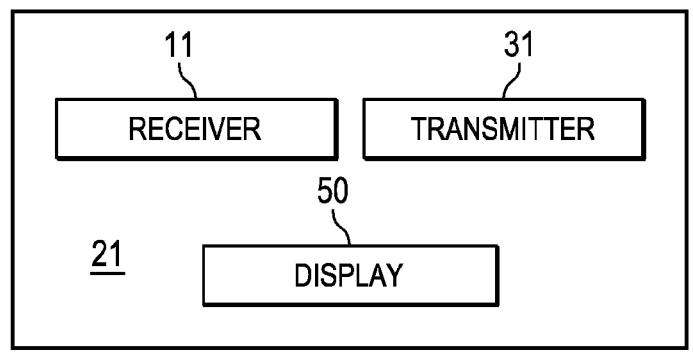
FIG. 1B illustrates a media player.
Figure 1C:
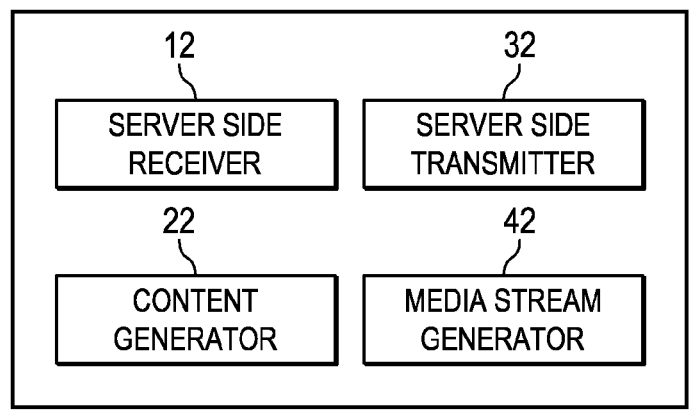
FIG. 1C illustrates a server.

FIG. 1, which includes FIGS. 1A-1C, describes a system for generating, delivering, and rendering the navigational media in various embodiments of the invention, wherein FIG. 1A illustrates the architecture, FIG. 1B illustrates a media player, and FIG. 1C illustrates a server.

Referring to FIG. 1, a typical media navigation system in accordance with embodiments of the invention includes a Media Generation Engine (MGE 20), a Media Delivery Engine (MDE 30), a Media Rendering Engine (MRE 40), a Query Mapping Engine (QME 60), and a Query Generation Engine (QGE 70). Each of these units will be described in detail further below (e.g., FIGS. 8-13).

The MGE 20 receives a media from a video server 10 and generates a media having navigational capability. The MDE 30 delivers the media along with the navigational data to the client (media player). The MRE 40 receiving the navigational media renders it to the display 50 of the media player.

The QGE 70 receives the input from the user and converts them into a navigational query. This navigational query is analyzed at a QME 60, which generates a list of results. For example, the QME 60 may request the video server 10 to deliver more media or the QME 60 may instruct the MGE 20 to process and generate the media in a certain way.

The MGE 20 may interact with a local or a cloud based data base having user preferences. Alternatively, the media player may directly communicate the preferences while requesting to stream the media.

In various embodiments, the input from the user may be generated at an input/output device within the media player. The input/output device may include sensors that are touch sensitive, temperature sensitive, audio sensitive, and/or motion sensitive.

In various embodiments, the MGE 20, the MDE 30, the MRE 40, the QGE 70, and the QME 60 may be part of a local server 100. Alternatively, some of the engines may be part of a local server 100 while some of the other engines such as the MRE 40 or the QGE 70 may be part of the media player (or anywhere along the delivery network up to the device). In some embodiments, the MGE 20, the MDE 30, the MRE 40, the QGE 70, and the QME 60 may be part of different servers.

FIG. 1B illustrates a media player in accordance with an embodiment of the invention.

Referring to FIG. 1B, the media player includes a receiver 11 configured to receive content information that provides a plurality of options to consume the media. A display 50 displays the content information of a media player 21. A transmitter 31 sends a request to stream the media based on one option selected from the plurality of options. In various embodiments, the receiver 11 receives a first media stream (e.g., from a local server 100 in FIG. 1A). The display 50 displays the first media stream in accordance with the selected option. Further details of the media player 21 will be described in further details in various embodiments below.

FIG. 1C illustrates a server, such as a local server 100 in FIG. 1A, for generating and delivering media to a media player in accordance with an embodiment of the invention.

The server comprises a server side receiver 12 for receiving a request to stream a media from a media player. The server also includes a content generator 22, a server side transmitter 32, and a media stream generator 42. The content generator is configured to generate content information providing a plurality of presentation options to consume the media. The server side transmitter 32 is configured to send the content information. The server side receiver 32 is also configured to receive a selected presentation option from amongst the plurality of presentation options. The media stream generator 42 is configured to generate a media stream comprising the media based on the selected presentation option. Further details of the server will be clear from various embodiments described below.

Figure 2:
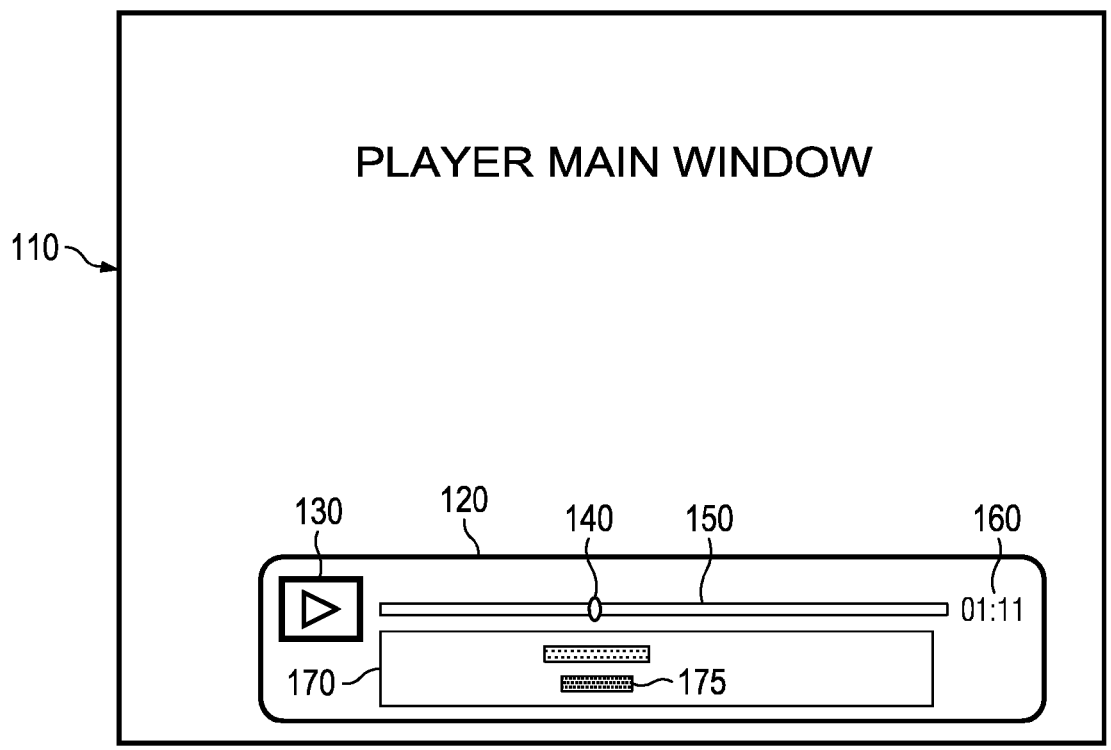
FIG. 2 illustrates a display of a media player in accordance with an embodiment of the invention.
Figure 3:
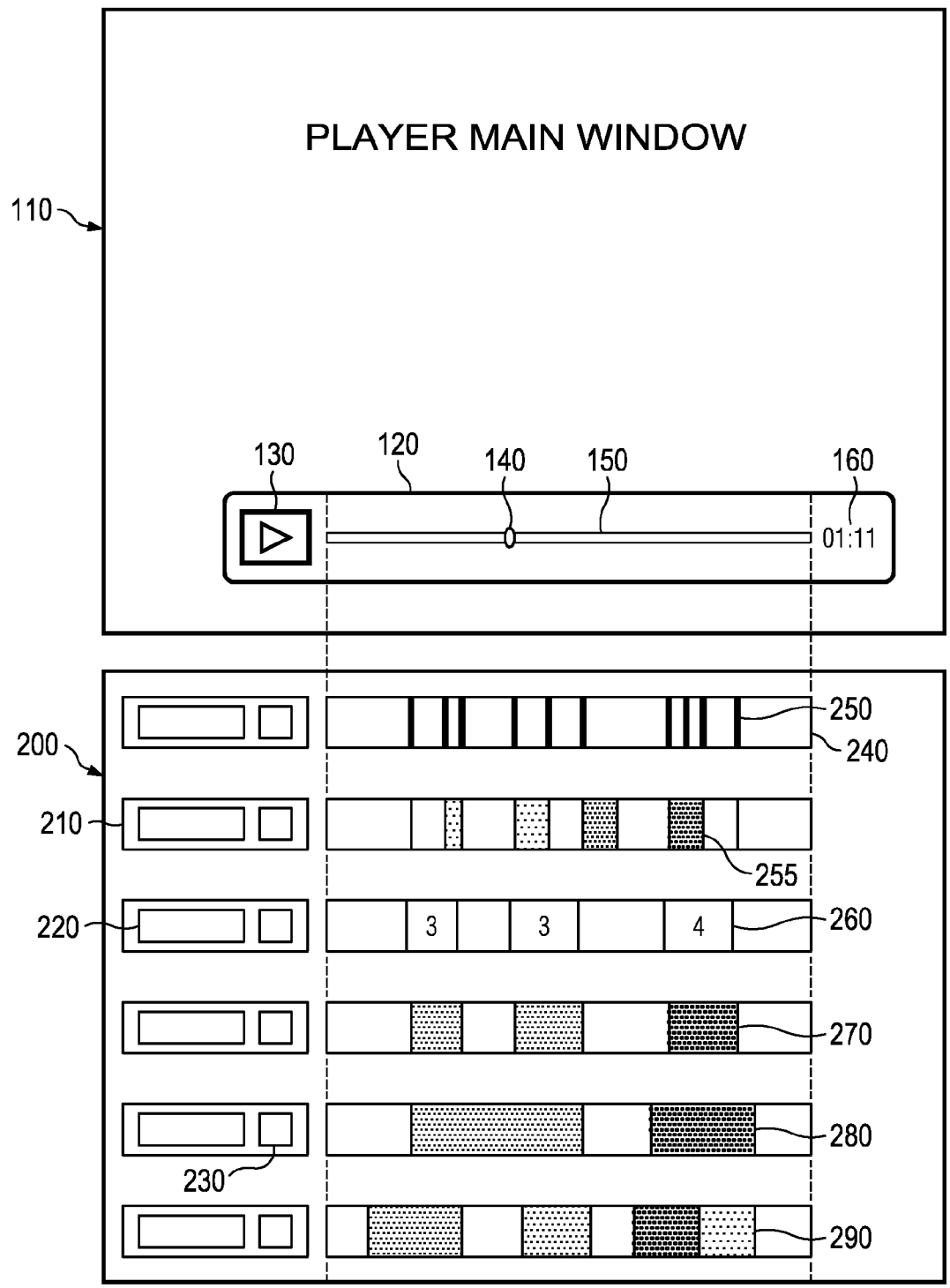
FIG. 3 illustrates another embodiment of a display of a media player, wherein the user is provided system generated navigable media.
Figure 4:
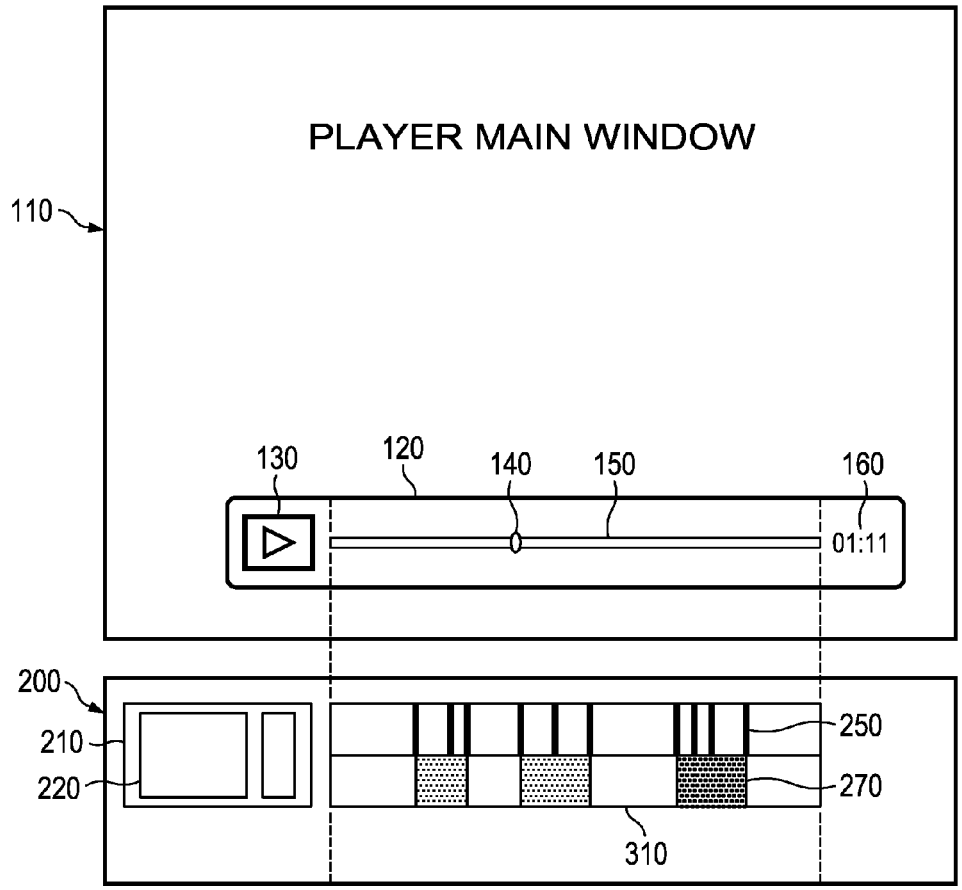
FIG. 4 illustrates an embodiment of the invention using a combination of more than one type of content information.

FIGS. 2-4 illustrate an embodiment of displaying media using preset option in which the media is preprocessed while FIGS. 6-7 illustrate another embodiment of displaying media in which user interaction is used in the media generation process.

FIG. 2 illustrates a display on a media player in accordance with an embodiment of the invention.

FIG. 2 illustrates the display 110 of a media player, which, in various embodiments, may be a display of a laptop computer, a desktop computer, a handheld computer such as a tablet, a netbook, or a smartphone. In one or more embodiments, the display 110 may be physically separate from the media player, for example, a monitor connected to a media player.

Referring to FIG. 2, the display 110 may include a play control box 120 for controlling the playing of the media. The play control box 120 may include features to play, pause, or stop the media stream, for example, using a play button 130. A time line 150 may indicate the location of the play head 140 within the media stream. Similarly, the total time length 160 of the media stream may be indicated.

Additionally, in various embodiments, the play control box 120 includes a navigational box 170. The navigational box 170 provides access to additional information regarding the scene being played. Alternatively, the play control box 120 and the navigational box 170 may be within separate parts of the display 110. Both or either the play control box 120 and the navigational box 170 may be hidden during normal playback.

In one or more embodiments, the navigational box 170 may have a plurality of navigational indicators 175. The navigational indicators 175 may furnish additional information regarding the scene, shot, or frame being played. For example, the navigational indicators 175 may provide information regarding how the scene was shot.

In another embodiment, the navigational indicators 175 may provide interviews with the actors or directors regarding the scene being played. In various embodiments, the navigational indicators 175 may provide information related to the scene, which may include editorial, cut-out scenes, related news, related critics, related advertisement, or any other information that a user would like to see. Upon clicking the corresponding navigational indicators 175, the requested information may be played in the same window or in a temporary pop-up window or an overlay on top of current rendering video layer on the same player.

In one or more embodiments, the users may also have a choice to configure the display as well as select the choice of the desired play back. The user configuration may be performed by the user in an initial set up, using a pre-configured file, using an adaptive learning process, or completely manually whereby the user inputs a choice for each selection. For example, the user may decide to watch the cut-out scenes of an interesting portion of the media stream. However, the user may want to see the cut-out scenes at a faster frame rate. Such a user may select the desired viewing parameters as described above. In an adaptive learning process, if the user manually selects a 2× frame rate for cut-out scenes, after a pre-determined number of selections, the media player begins to render cut-out scenes at 2× frame rate. In various embodiments, the users have flexibility to select viewing parameters such as browsing speed including constant or varying frame rate, type of information displayed.

In various embodiments, the selected media may be requested from the same video server 10 or from a different video server. For example, in response to a user request, the QME 60 may find that the video server 10 currently holding the media does not have the requested scene. However, the QME 60 may be able to obtain this media from another video server.

FIG. 3 illustrates another embodiment of a display of a media player, wherein the user is provided system generated navigable media.

In various embodiments, the system generated content may be based on consumption patterns. The system generated content may include both media as well as reference information (metadata, which is information describing the media). The system generated content is designed to help the user quickly gauge the prototypical methods of consuming the given content. The system generated content may be customized on a per user basis so that personal preference can be presented more prominently over the rest of the consumption methods.

Referring to FIG. 3, the display 110 of a media player includes a content box 200 for displaying system generated content. In various embodiments, the content box 200 may be presented upfront or hidden behind some clickable button or object. The content box 200 includes a plurality of content type boxes 210. Each of the content type boxes 210 has a descriptor box 220 describing the type of content and may also include a time box 230 showing the time taken to play the content displayed. Further, each content type box 210 includes a display box 240 for showing the corresponding system generated content information. In various embodiments, the information within the display box 240 may be synced to the current media being played so that it may continuously change as the media is played. This syncing between the information in the display box 240 and the video being played provides an interactive experience to the user. Thus various objects may appear or disappear depending on the scene being played.

In various embodiments, each of the content type boxes 210 may display a different type of content. For example, a first content box may include highlights 250 within the media. Highlight based content help users looking for a subset of the video content as summary or highlight to reduce time investment. These highlights 250 may be highlights of scenes, shots, frames, or other suitable units within the media stream. A user may choose to watch only the highlights 250 within the media, and select a highlight with an appropriate length optimal for the user's available time, for instance.

In various embodiments, the highlights may be categorized based on user preference. For example, the user may indicate that she wants to watch financial highlights within a new bulletin. Thus, the highlights 250 indicate portions within the media stream having the financial highlights. The user has the option to scroll from one highlight to the next, or watch a continuous media stream of just the highlights. For example, in FIG. 1, this user preference is communicated by the QGE 70 to the MGE 20 using the QME 60. The MGE 20 generates a media stream showing the highlights from the media stream.

In one or more embodiments, the highlights may be generated by the user, user preference, and/or user behavior. In one embodiment, a user may have determined, for example, by tagging or adding highlights into a media stream, the portions within the media that interest him. Alternatively, the highlights may be decided by the user or the system based upon regions of the media that a particular user watches often. For example, the user may show a portion of a school competition video in which her daughter performs. The user may repeatedly watch this portion of the school video while skipping other portions. This behavior of the user may be automatically monitored (e.g. using a SLE 80 described in FIG. 15) and the media highlights 250 may be generated in one embodiment. In another embodiment, the user may tag this portion of the video as custom highlight, which is presented to the user as highlights 250, while watching this media at a later point in time or share with friends and family as one of the preset selectable highlight options.

Embodiments of the invention may include a second content box 210 displaying objects 255. Objects 255 may be segments of the media stream generated based on user interests. The objects 255 may be any part of the image in the most general embodiment, and may be representative of specific people, animals, things, objects of interest, etc. in specific embodiments. As an illustration, the objects 255 may comprise all scenes having a particular character within a movie. For example, a user may be interested in watching all the events performed by a particular swimmer from amongst all media content from the Olympics. The swimmer may appear in different events within the media, for example, during the preliminary heats, quarterfinals, semifinals, finals etc. Upon user input through the QGE 70, and feedback from the QME 60, the MGE 20 generates a media content showing instances in which the swimmer appeared (see, FIG. 1). The instances may be classified on story, scene, shots, a particular number of frames, or any other suitable media length. In various embodiments, the rendering method of these selected media options comprising a target object (e.g., swimmer) may be implemented via a series of video markers, for example, indicated on control bar of the media player so that an user may jump from one appearance of the target object to subsequent appearances.

As illustrated in FIG. 3, the display of the media player displays the instances over which one or more objects 255 appear within the media stream. For example, multiple objects 255 may be displayed using color, pattern, or numeric coding. The user may input their object preferences during or prior to the rendering of the media stream. In one or more embodiments, the objects 255 may be entered based on user highlighting (including using mouth, touch, eyebrows etc.), audible input such as sound or speech dictation, physical movement of the user such as mouth, eye brows, gesture, brain wave (BCI), or via an adjunct device (also known as secondary device such as a smartphone or tablet in hand), or other input methods.

One or more embodiments of the invention may include a content box 210 with audio cue points within the content box 200. Audio cue points may be audio or textual data relating to different portions of the media. A user may be able to select audio clips such as words, phrases, or sound clips related to that portion of the media or speech transcripts extracted from the video during pre-processing, for example, by the MGE 20 (FIG. 1). In various embodiments, all of the above descriptions relating to video object selection/combining may also be applied to audio clips and segments, in parallel with the video processing in one embodiment. However, the selection process may be tailored (different) because cannot be visually selected unlike video.

An embodiment of the invention may include a content box 210 with scenes 290. Scenes 290 may be based upon a user decision point in one embodiment. In one or more embodiments, the scenes 290 may represent a type of event within the media. In other embodiments, scenes 290 may be decided during media pre-processing, for example, at the MGE 20 in FIG. 1. As an example, scenes 290 of an NBA game can be consumed by looking only at the free throws or all the 3-point shoots, etc. Such scene based classification may be performed during pre-processing either at the video server 10 or the MGE 20 (e.g., FIG. 1).

An embodiment of the invention may include a content box 210 with classification based on interest of other users. Interest base consumption method may include information on the consumption of the media rather than just different aspects of the media. In one or more embodiments, a user may be presented with information of how other users have consumed this content. This information may be presented to the user in different forms. For example, a heat map may show regions of the media having more or less hits. The heat map may indicate consumption of a piece of media within the video and may be within different groups, for example, within a geographic area or group of consumers etc. Such heat maps may be fed back using metadata in some embodiments. Such hit portions may be illustrated statistically using numerical codes 260 or visually using color maps 270 as illustrated in FIG. 3.

Interest information may also be shown as textual data, e.g., in form of tags. In various embodiments, the content box 210 shows the distribution of tags inserted by other users within the media. A tag is a user inserted piece of information (comments, reaction, additional info, etc.) that may be on a per video basis (existing today) or on a time-stamp based where the comment is inserted at the exact moment of the media and/or even tagged on an object within the video image space (not available).

Further, in some embodiments, the interest classification may combine the hit information with different user groups.

In various embodiments, user groups may be user defined, e.g., circle of friends, family, user city, user religion etc. In some embodiments, the user groups may be preselected during pre-processing based on user consumption patterns and user social networks etc. For example, a user may be shown the comments of his friends on a specific segment of a video. The user may want to watch only that specific content without watching all of the media. In various embodiments, the user may select the portion of the media playing this segment by using the control box 210 showing the user interest data such as numerical codes 260, color maps 270, or other textual data. In various embodiments, the rendering of other related consumption data may be based on location (e.g., country, city, town), and/or social grouping based (e.g., school, community, profession, religion, friends circle, family, and relatives, etc.).

In various embodiments, the interest information may be available for consumption to the user in different ways. For example, a user may be able to choose to watch only portions of the media having a certain minimum interest. Or a user may be able to watch portions of the media having less interest at a faster frame rate than a portion of the media having more interest. Alternatively, a user may decide to watch only portions of video with a certain interest level, e.g., one having the most interest or ones having interest comments, or most taggings etc.

FIG. 4 illustrates an embodiment of the invention using a combination of more than one type of content information.

Previous embodiments described the use of scene selection windows displaying related and additional information in various forms. For example, FIG. 2 illustrates the use of navigational indicators 175 to furnish additional information while embodiments of FIG. 3 illustrate a content type box 210 displaying the occurrence of different types of content within the media. In one or more embodiments, the display box 240 may illustrate a time line showing a combination of interest data and another content type. For example, the time line may illustrate a combination of interest data such as color maps 270 and headlines 250, or distribution of timed tags (both users inserted or system/publisher inserted), or alternatively summary data.

Further, in or more embodiments, the combined interest-summary information 310 may be weighted. For example, if the headline data as a function of time is H(t) and the interest information (e.g., hit rate) as a function of time within the media is I(t), the combined interest-summary information 310 may represent H(t)I(t). This weighting may be implemented in various ways. For example, in one way, the interest data may change the speed or frame rate of the media. Therefore, headlines or summary of the media having the most interest will be played at normal speed while headlines or summary of the media having less interest will be played at faster frame rates or in the presence of Adaptive BitRate, select a lower bitrate or both. Thus, the user will cover the less interesting headlines quickly while spending more time on the more interesting portions.

FIGS. 2-4 illustrate only a few ways of implementing the above while embodiments of the invention include variety of different presentations. In various embodiments, users are offered prototypical consumption methods that have broad utility. For example, the methods may be further broken down into different content type box 210 when the total methods/options are too long to be rendered within a single content type box 210.

Figure 5A:
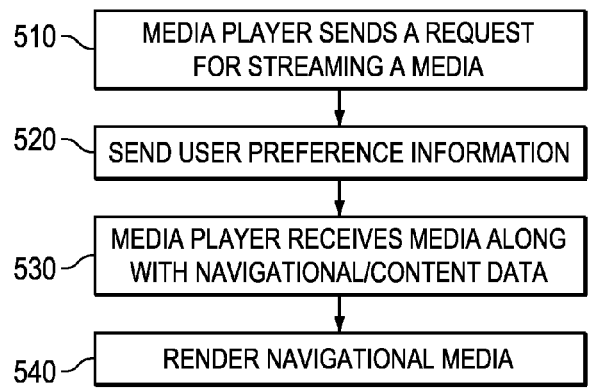
FIGS. 5A-5C, illustrates operations in accordance with an embodiment of the invention for displaying media as described with respect to FIGS. 2-4.
Figure 5B:
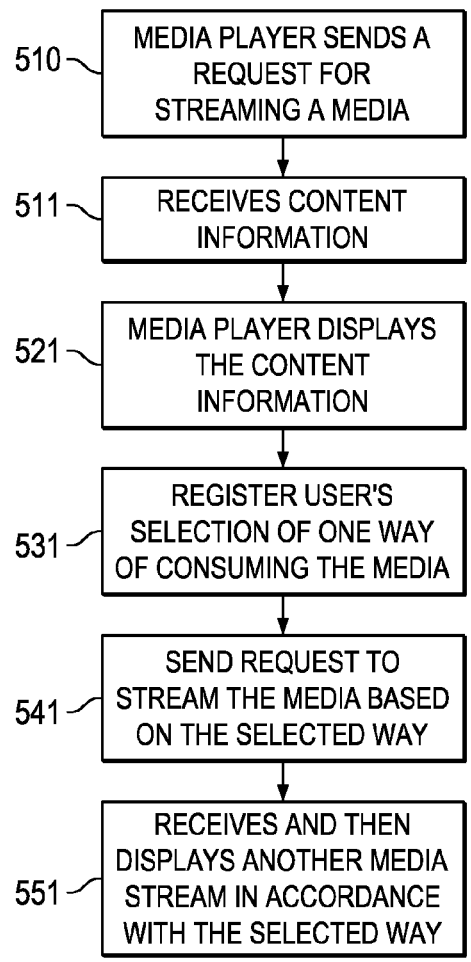
Figure 5C:
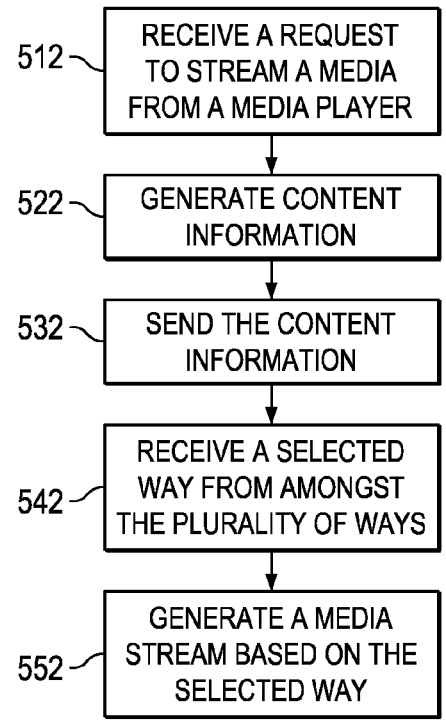

FIG. 5, which includes FIGS. 5A-5C, illustrates operations in accordance with an embodiment of the invention for displaying media as described with respect to FIGS. 2-4.

Referring to FIG. 5A, a client, e.g., media player sends a request for streaming a media (Step 510). The media player may also send further user information such as a user preference information (e.g., as described above) (Step 520).

In one embodiment, the media player may provide further information regarding the navigational indicators (FIG. 2) that the user would like to be furnished. As an example, the media player may request to be provided with cut-out scenes and interviews but not any information regarding reviews, ratings, and editorials for a movie.

In another embodiment, the media player may choose the categories of content type to be provided for each media. As an example, the media player may request to be always provided with headline information. Similarly, the media player may define the preferred resolution and frame rate for the headlines if requested by the user.

The media player receives the corresponding media stream along with the navigational/content data (Step 530). Next, a display of the media player shows the media stream and the navigational/content data (Step 540).

In an alternative embodiment described in FIG. 5B, a client, e.g., media player sends a request for streaming a media to a media server (Step 510) and receives content information (Step 511). The content information includes different options to consume the media. For example, a user can select a certain option to consumer the media as described in FIGS. 2-4. The media player displays the content information in a player window (Step 521), e.g, as navigational box 170 (FIG. 2) or content box 200 (FIG. 3). While watching or before watching the media, the user may select one way of consuming the media from the content information (Step 531). A request to stream the media based on the selected way is transmitted (Step 541). The media player receives and then displays another media stream in accordance with the selected option (Step 551). In some embodiments, small portions of various media streams/options are downloaded along with the initial media stream so that subsequent navigations render quickly without delay. For example, a small portion, in one case a few second worth of video, of each key options may be downloaded initially so that subsequent navigation between the key options is rendered very quickly.

In an alternative embodiment described in FIG. 5C, a method of displaying a media at a media server comprises receiving a request to stream a media from a media player (Step 512). The media server generates content information comprising a plurality of options to consume the media (Step 522). In this embodiment, the media server pre-processes the media generates the content information. For example, this may be performed at the MGE 20 described in FIG. 1. The MGE 20 may generate different ways to consume the content, e.g., highlight, summary, scenes etc. as described above using FIGS. 2-4.

The media server sends the content information (Step 532). The method further includes receiving a selected way from amongst the plurality of options (Step 542). For example, a user may select a certain preference to watch the media. This information is received at the media sever. The media server generates a media stream in which the media is based on the selected option (Step 552). For example, if the user selected to watch only highlights, the new media stream is a stream of highlights.

FIG. 6-7 illustrate alternative embodiments of using navigational media having spatial and temporal user interaction.

Spatial media navigation allows users to navigate the video in spatial domain in a variety of manners. Thus, the user is provided an interactive experience. The use may interactively request the media of interest while watching the media.

Unlike the prior embodiments, described previously, in these embodiments, the users are initially rendered a media stream having less information than the original media. For example, a higher resolution 1080p media file may be streamed at 640p to minimize bandwidth or account for limitations in the display of the media player. Similarly, a high resolution original media such as an IMAX movie having a wider perspective or a 360 degree view video or a multi-view video may be converted in a plurality of separate movie streams so that a user may switch between the different movie streams to get different perspective of the media during streaming. Multi-view videos may include multiple views of a subject/point of interest, and multiple views from a point looking out at different angles, or graphically, e.g., using graphic keys.

Figure 6A:
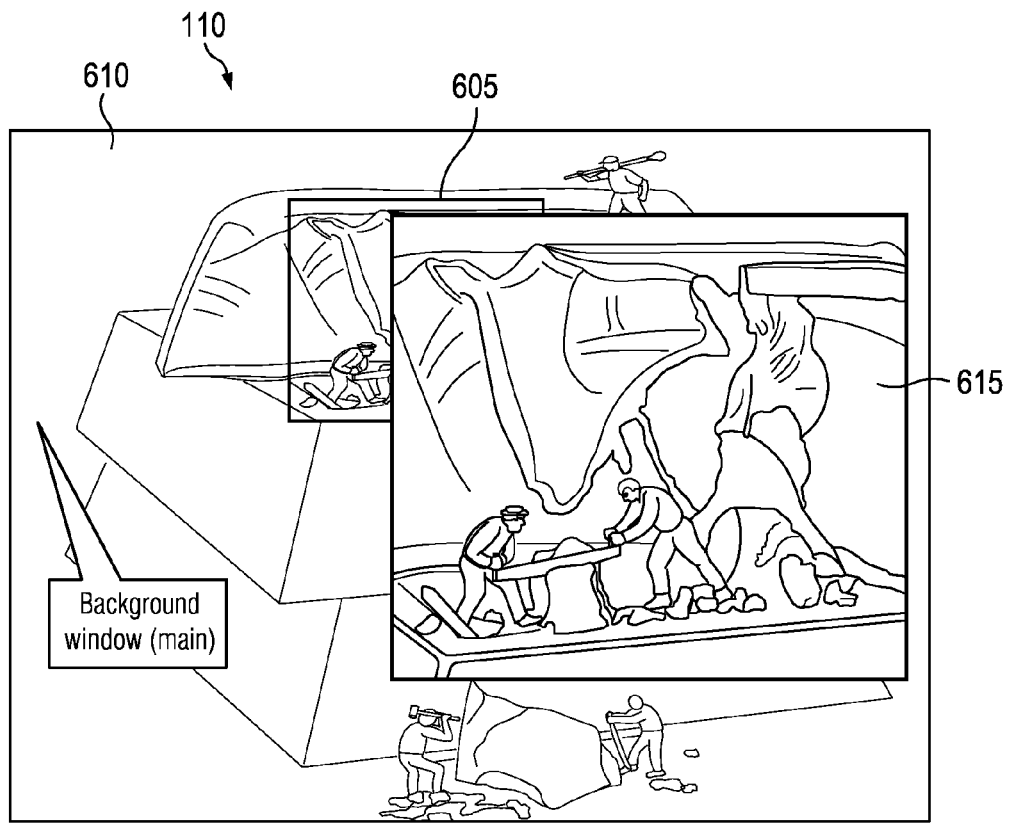
FIG. 6 illustrates a display of user selectable navigable media in accordance with an embodiment of the invention.

FIG. 6 illustrates a display 110, which may be part of a media player or may be separate from the media player in accordance with an embodiment of the invention. Referring to FIG. 6A, a display 110 of the media player outputs a main window 610 playing the media. However, the media being played has been pre-processed and divided into a plurality of angles, views, objects, regions, scenes, stories etc. as will be described later in more detail. In one or more embodiments, these pluralities of angles, views, objects, regions, scenes, stories etc. may include embedded links or queries to additional or related content.

For instance, as illustrated in one example in FIG. 6A, users may highlight a specific object/region, 'blow up' an object/a region of interest to see more details of that particular object/region and/or to obtain more information about the highlighted portion, or do a combination of the above.

Figure 6B:
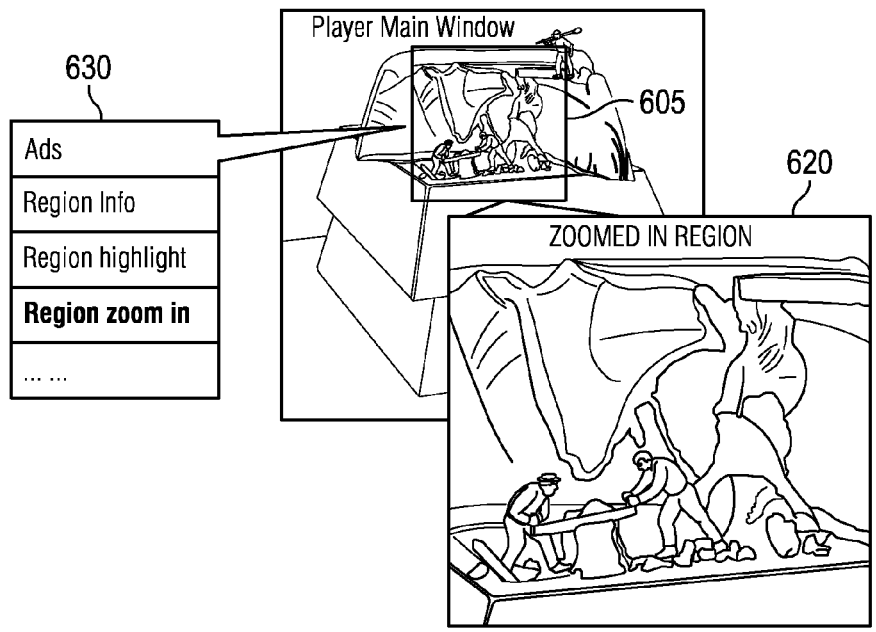

In various embodiments as illustrated in FIGS. 6A and 6B, a multiple layered view of the scenes may be used. In the embodiment of FIG. 6A, the highlighted portion 605 of the video pops up to the foreground in the same video as a foreground window 615, but the original video may be slightly dimmed to the background. The highlighted portion may be played at a higher resolution in the foreground window 615 relative to the original resolution of the highlighted portion 605 in the original window, now in the background.

In one or more embodiments, the original video may continue to play in the background, for example, at a lower resolution to avoid consumption of resources until the new window is closed in one embodiment.

Embodiments of the invention may also include a multiple layered audio scheme. For example, in FIG. 6A or 6B, the audio of the main window may include substantial background noise. However, when the user zooms or selects a particular object or region, the audio of the objects within the selected portion is magnified relative to the background when the media is played in the new window.

In the embodiment of FIG. 6B, the highlighted portion 605 of the video pops-up and plays in a different pop-up window 620. Thus, in one embodiment, the video continues playing in the pop-up window 620 while the original window may be dimmed and may play at a lower resolution.

Figure 6C:
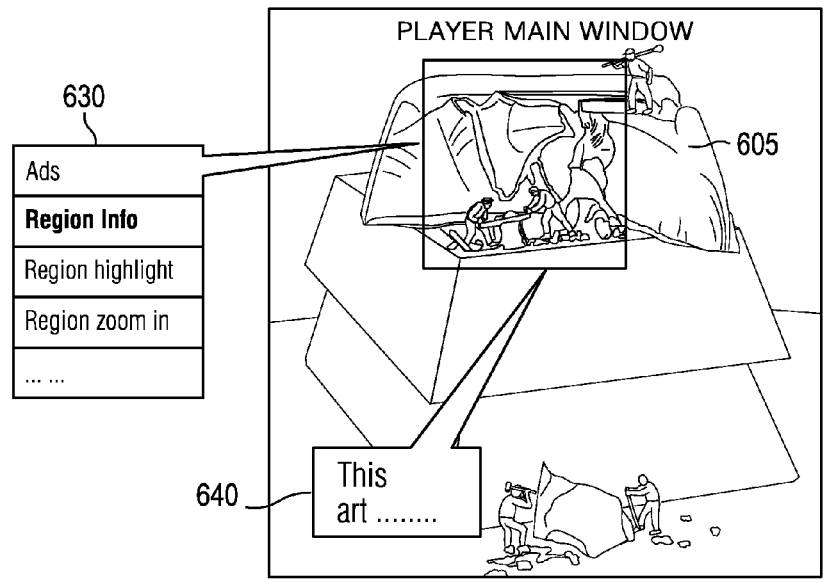

In an alternative embodiment illustrated in FIG. 6C, after selecting objects/regions within a highlighted portion 605, users may click on a pop-menu 630 and obtain information, such as textual description 640, related to the selected object/region.

Advantageously, in or more embodiments, the audio output of the media player is continuous and smoothly transitions while transitioning the display to the highlighted portion 605.

In various embodiments, the media player may allow users to choose the way they want to navigate. The user may be provided various options based on the user preferences and profiles or may be provided instantly based on user input.

Embodiments of the invention include contextual media navigation to enable additional media consumption via context aware modeling. A contextual media navigator enables users to navigate through a media in different spaces based on the specific context of interest.

Figure 7A:
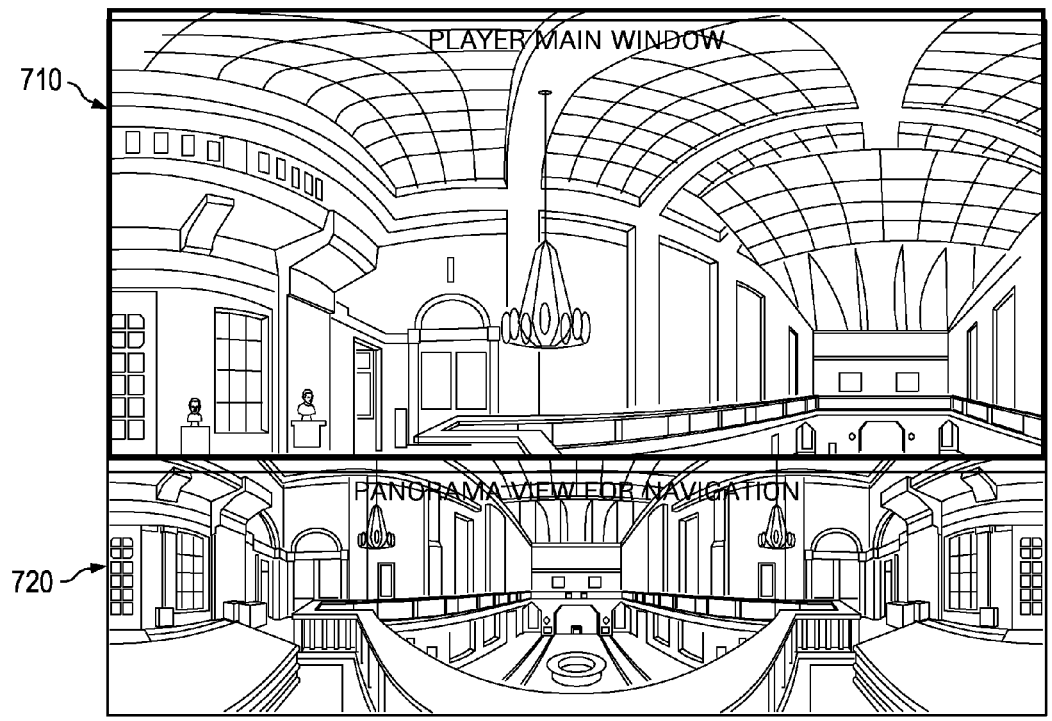
FIGS. 7A-7C, illustrates an embodiment of the invention highlighting a panorama based spatial navigation.
Figure 7B:
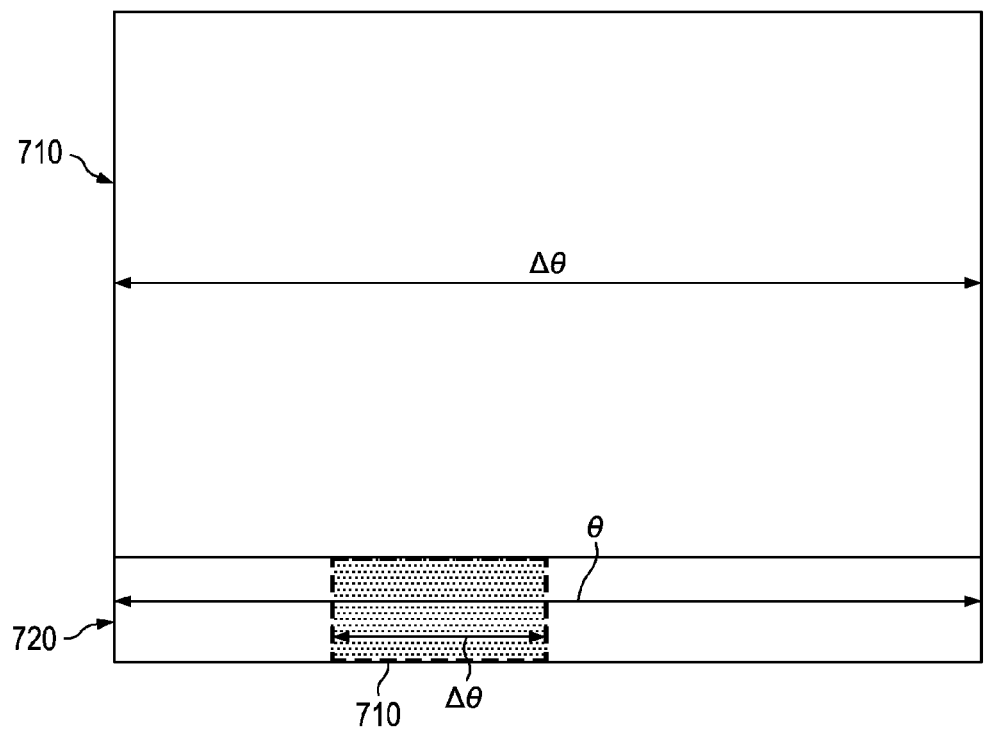
Figure 7C:
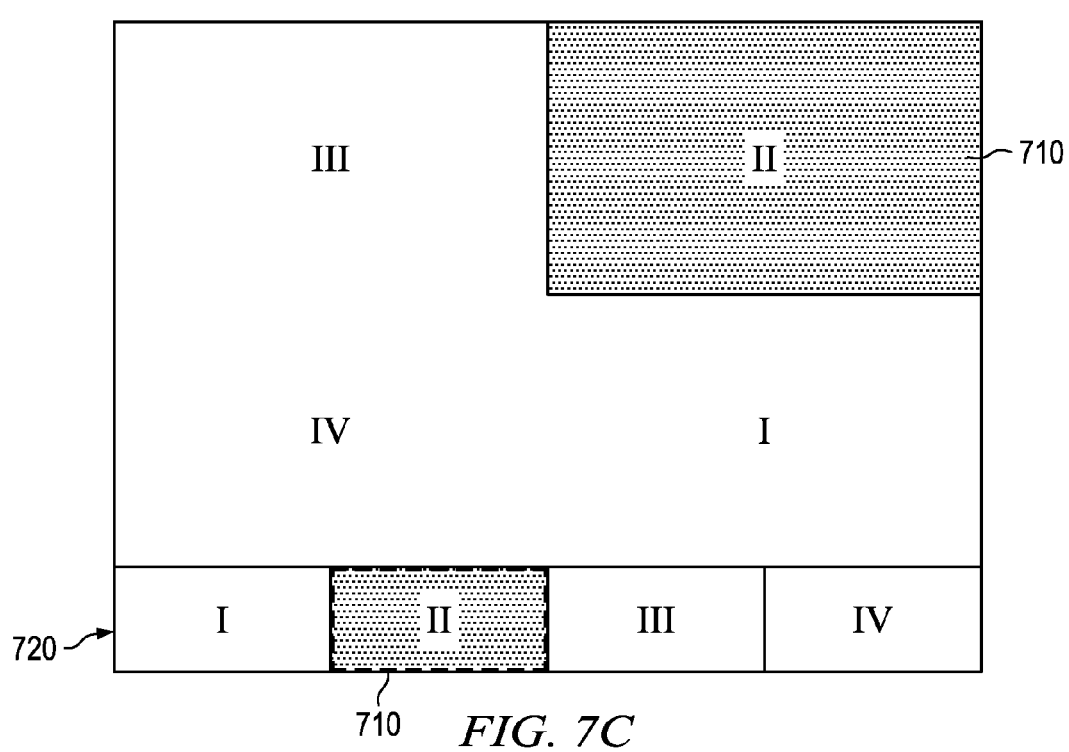

FIG. 7, which includes FIGS. 7A-7C, illustrates an embodiment of the invention highlighting a panorama based spatial navigation.

As illustrated in FIG. 7A, the play main window 710 displays the media stream while a portion of the display shows the complete media that may be viewed using a preview display window 720. For example, FIG. 7 illustrates a 180° preview display window 720 from which the user may select a portion of the media to watch. In another embodiment, a 270° or a 360° preview display window 720 may be used.

FIG. 7B illustrates an embodiment in which the original media is a panoramic movie having an angle of view θ as shown within the preview display window 720. A user selects a portion of the angle of view Δθ.

FIG. 7C illustrates another alternative embodiment wherein a high resolution media such as a 4K media (e.g., 4096×2160 pixels) having a larger view may be converted into a lower resolution media such as 2K (e.g., 2048×1080 pixels) media having a smaller view angle while adding a preview display window 720 from which the user may select a portion of the media. To illustrate clearly, the original picture size is shown with four quadrants (I, II, III, and IV). The user has selected the second quadrant II which is being streamed at 2K. The user may select other quadrants from the preview display window 720.

In one or more embodiments, the properties of the preview display window 720 may be automatically adjusted, for example, at the time of the media generation at the MGE 20 (FIG. 1).

In various embodiments, the preview display window 720 may be predefined, for example, allowing the user to select from certain angle of views. For example, the preview display window 720 may include clickable objects or regions. Alternatively, the preview display window 720 may be user selectable in which the users may select the angle of view.

Figure 8:
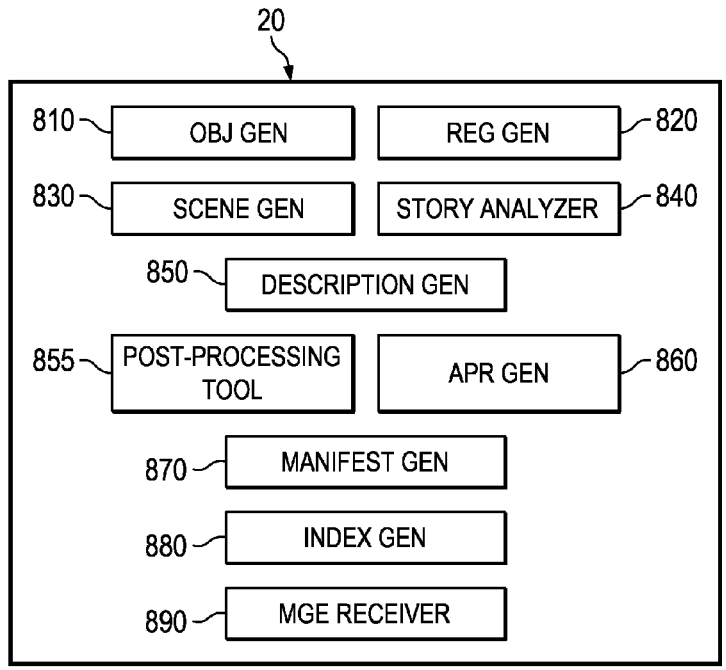
FIG. 8 illustrates a media generation engine in accordance with an embodiment of the invention.

As another example, embodiments of the invention presented in FIGS. 7 and 8 offer advantages in low bandwidth situations. A MGE 20 may generate a lower resolution media and a MRE 40 may receive fewer layers of the descriptor data depending on the capabilities of the media player as well as the network conditions.

The navigational system implementing the above described methods will now be described using FIGS. 8-13.

The following is defined prior to the description of the navigation system to facilitate the description. Let Obj(i) denote the $i^{th}$ object (i.e., object i) within a media, Reg(i) denote the $i^{th}$ region (i.e., region i) within a media, Scn(j, $t_1$, $t_2$) denote the $j^{th}$ scene with starting time $t_1$ and ending time $t_2$, and Sty(k, $t_1$, $t_2$) denote the $k^{th}$ story with starting time $t_1$ and ending time $t_2$. Let Loc(Obj(i), t) denote the location of the $i^{th}$ object Obj(i) at time t, and Loc(Reg(i),t) denote the location of the region i Reg(i) at time t.

Let Szo(Obj(i), t) denote the original display size of the object i Obj(i) at time t, Szo(Reg(i), t) denote the original display size of the region i Reg(i) at time t, Rsz(Obj(i), t) denote the display size of the object i Obj(i) relative to the original size of the object in the media at time t, and Rsz(Reg (i),t) denote the display size of the region i Reg(i) relative to the original size of the region in the media at time t.

The media playback speed relative to the normal playback speed at time t is denoted as speed V(t). Therefore, the zero speed, i.e., V(t)=0, represents a pause in the playback and an infinite speed, i.e., V(t)=∞, represents a skip or jump over. For instance, V(t)=2 represents a fast forward at 2× of the normal playback speed.

Let Apr(Obj(i)) represent the accessibility of object i, Apr (Scn(j, $t_1$, $t_2$) represent the accessibility of scene j, and Apr (Sty(k, $t_1$, $t_2$) represent the accessibility of the $k^{th}$ story, with Apr(a) ∈ [0, AObj], Apr(a) ∈ [0, AScn], and Apr(a) ∈ [0, ASty] respectively. Here, AObj, AScn, and ASty identify the maximum accessibility level that may be defined based on different service provider preference or application requirements.

FIG. 8 illustrates a media generation engine (MGE 20) (e.g., FIG. 1) in accordance with an embodiment of the invention.

In various embodiments, the MGE 20 may be part of a local server, a network server, a cloud server, or part of the media player.

The MGE 20 includes an object generator 810 to generate a plurality of objects within a media and a region generator 820 to generate a plurality of regions within the media. The MGE 20 also includes a scene generator 830 to generate a plurality of scenes within the media and a story analyzer to analyze the media and generate one or more stories within the media. The MGE 20 further includes a description generator 850 to describe each of the above. For example, the description generator 850 may generate descriptions for each object within the plurality of objects, each region within the plurality of regions etc. The MGE 20 may include a post-processing tool 855 that computes properties of the generated objects, regions, scenes, and stories. For example, the post-processing tool 855 may compute the location and original resolution of an object generated by the object generator 810. The MGE 20 may also include an apr generator 860 to generate the accessibility of the above objects, regions, scenes, stories etc within the media. The MGE 20 may include a manifest file generator 870 and an index file generator. The manifest file may include description regarding the accessibility and other metadata to facilitate media to be navigable. In various embodiments, the index file may include information regarding the data structure of the description data stream. The following description provides further details on the various units within the MGE 20.

Thus, as described above, the MGE 20 includes an object generator 810 generating the objects Obj, a region generator 820 for generating the regions Reg, a scene generator 830 for generating the scenes Scn, a story analyzer 840 for generating the stories, a description generator 850 for generating the descriptions, a post-processing tool 855 for generating location and display size information for the processed media, a Apr generator 860 for generating the accessibilities, a manifest file generator 870 and an index file generator 880. The MGE 20 may also include a MGE receiver 890 to receive media.

Figure 9:
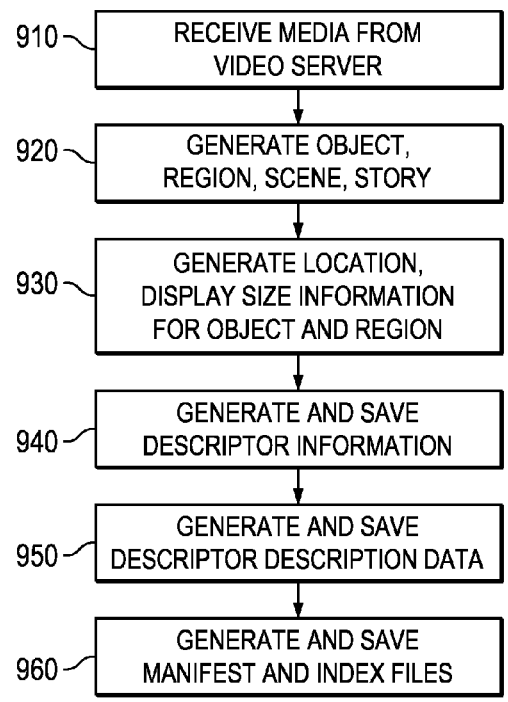
FIG. 9 illustrates the operations of the media generation engine in accordance with embodiment of the invention.

FIG. 9 illustrates the operations of the MGE in accordance with embodiment of the invention.

Referring to FIG. 9, the MGE 20 receives a media from the video server 10 (step 910). The media is analyzed to generate output and intermediary objects and files. In various embodiments, the object generator 810 in the MGE 20 generates the object Obj(i) and the region generator 820 generates the region Reg(i) such that i=[1, I]. Similarly, the scene generator 830 and the story analyzer generate the scenes Scn(j), j=[1, J] and the stories Sty(k), k=[1, K] respectively.

The location, original display size, and relative display size are computed for each location and region within the media, i.e., Loc( ) Szo( ), Rsz( ) of Obj(i) and Reg(i) are generated (step 930).

Next, in various embodiments, at the description generator 850, descriptors for each object, region, scene, and story are generated (step 940). For example, metadata that includes various information about the objects, regions, scenes, and stories within the media. The metadata may be generated using an approachable media description scheme in one embodiment.

In one or more embodiments, the descriptors may be saved separately, e.g., as a descriptor data file or may be saved with the video data stream. For example, in one embodiment, this may be selected depending on the service provider's specifications. In most applications, the descriptors are saved separately for quality of experience (QoE) optimized video access and navigation scalability.

Various embodiments of the present invention use a layered description scheme to facilitate scalable media navigation. In various embodiments, media description schemes in available standards such as MPEG21 and MPEG7 may be used. Alternatively, a simpler scalable description scheme may be defined such that multiple dimensions of layers along temporal and spatial dimensions of containers, which may be groupings of regions or objects, may be used to facilitate scalability.

In one or more embodiments, the accessibility of the video may be defined by the service provider or application requirements. Policies of accessibility of the video may be defined and created at the MGE, e.g., using the Apr generator 860.

After the descriptors are extracted, the corresponding descriptor description data may be generated (step 950). The descriptor description data describes the previously generated descriptor information.

Next, the manifest file and the index file are generated (step 960). The index file may include lists of the data structure of the objects, regions, scenes, and stories description data stream. The index file may also include synchronization data to enable these to be synced to the media file.

The manifest file may serve as the descriptor description file. The manifest file may comprise different description, Apr data, and other metadata to facilitate different uses of the navigable media. For instance, the descriptor file location, the overall metadata, such as navigable media accessibility, usable policy, media title, genre, and producer info, and additional annotations, etc. may be included in the manifest file.

In one embodiment, the manifest file is packaged separately from the descriptor data file. In another embodiment, the manifest file may be packaged into the same file as the descriptor data file. In various embodiments, the decision may be made based on application requirement, service requirement, etc.

With the index file, a player can easily and quickly allocate the description media data for media navigation. In some cases, it also helps to conserve resources such as bandwidth and memory. In this case, the descriptors are extracted in real time. Notice that this embodiment is only suitable in certain application scenarios where real time extraction is easily achievable and cost effective.

In another embodiment, the descriptor extraction takes advantage of the cloud computing resources. The description data streams are delivered separately but in time for media navigation at the player.

Figure 10:
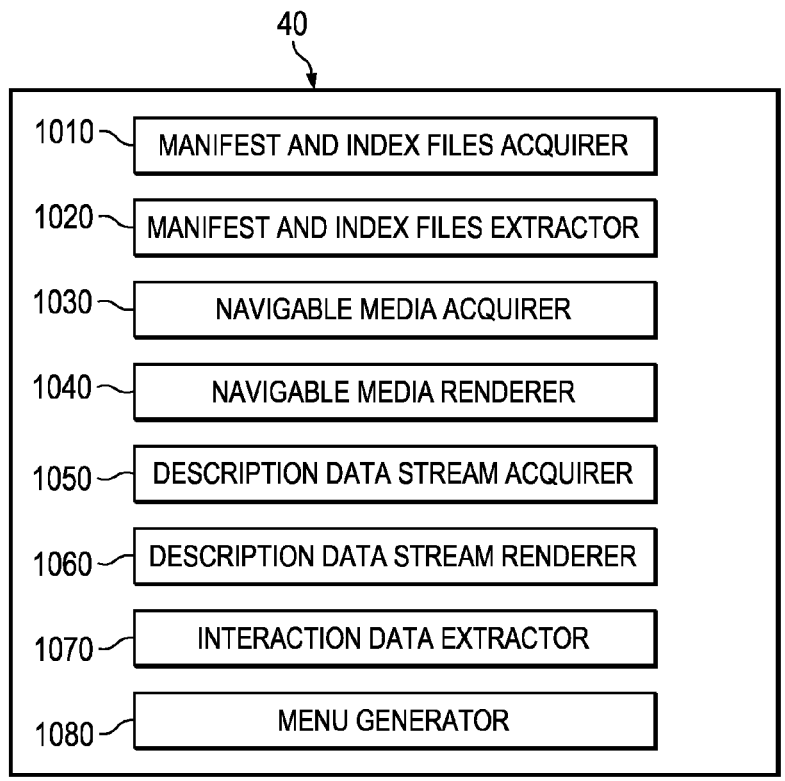
FIG. 10 illustrates operations performed at the media delivery engine in accordance with embodiments of the invention.

The approachable media delivery engine (MDE 30) will now be described. FIG. 10 illustrates operations performed at the MDE 30 in accordance with embodiments of the invention.

In various embodiments, the MDE may be part of a local server, a network server, a cloud server, or part of the media player. In various embodiments, the approachable media delivery includes the delivery and synchronization of the descriptors along with the video data stream to assure scalable and QoE optimized delivery.

In one embodiment, the descriptors are delivered to the client for navigable media access. A layered packaging and scheduling scheme may be used to facilitate scalable and QoE optimized delivery and access. In one case, descriptors in different layers of containers may be packaged in different layers for delivery. Package deliveries are prioritized based on the location of the container layer.

In other embodiments, the descriptor data streams may be maintained at a server, for example, where thin clients are enabled for navigable media access. Interactions and navigations are jointly achieved with the descriptor processor/server and the client.

Details of the implementation algorithms are skipped because a person having ordinary skill in art can easily implement such packaging and scheduling algorithms in different styles based on the specific application and service requirements.

The approachable media rendering engine (MRE 40) will now be described using FIGS. 10 and 11.

FIG. 10 illustrates the components within the MRE 40. A generic MRE 40 may include a manifest and index files acquirer 1010 for acquiring the manifest file and the index file, manifest and index files extractor 1020 for extracting the acquired manifest file and the index file, a navigable media data stream acquirer 1030 for acquiring the navigable media data stream and a navigable media data stream render 1040 for rendering the navigable media data stream.

The MRE 40 may optionally include a descriptor data stream acquirer 1050 and a descriptor data stream render 1060.

Figure 11A:
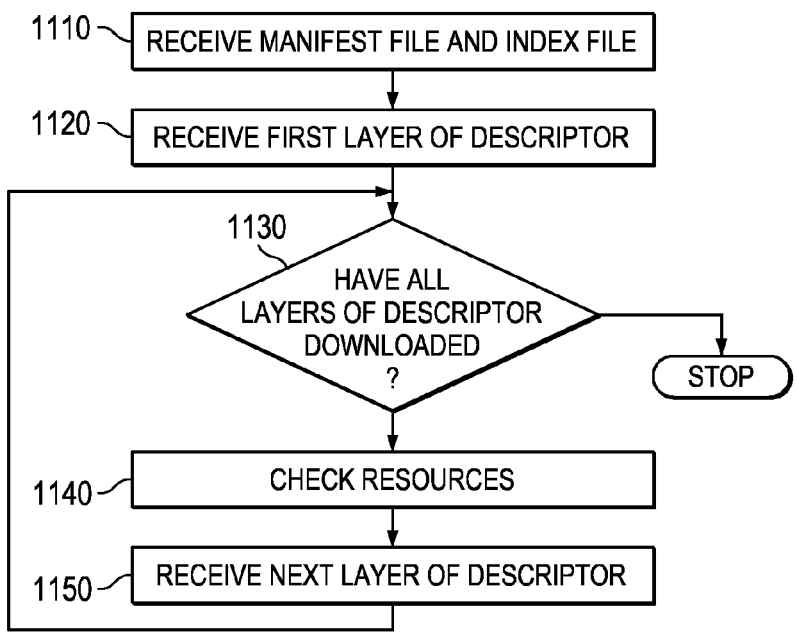
Figure 11B:
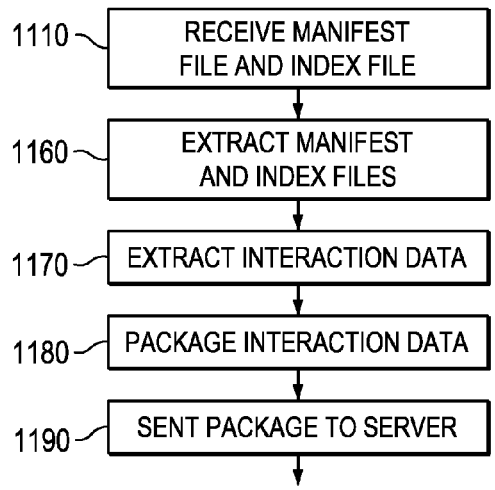

FIG. 11, which includes FIGS. 11A and 11B, illustrates operations within the MRE in accordance with embodiments of the invention, wherein FIG. 11A illustrates the embodiment where the descriptor data stream is received by the MRE 40, and wherein FIG. 11B illustrates the embodiment where the descriptors are maintained at a server.

FIG. 11A will be described along with FIG. 10 in accordance with an embodiment of the invention.

Referring to FIG. 11A, the MRE 40 receives the manifest and index files from the MDE 30 (Step 1110). If the descriptor description data file is separate from the manifest file, the descriptor description data file is received before or after receiving the manifest and index files.

Next, the MRE 40, e.g., at the description data stream acquirer 1050, receives the first layer of the descriptors (Step 1120). As next illustrated, the MRE 40 checks if all descriptors in the descriptor data files have been downloaded (Step 1130). Further, depending on the application and service specifications, not all layers of the descriptors maybe acquired in some embodiments.

Referring to step 1140, to assure QoE, MRE 40 checks availability of resources, especially network conditions while the video stream is downloaded to decide how and when to get the associated navigable media data streams. For example, the MRE 40 may decide not to download the higher resolution navigable media data streams because of the need for large bandwidths. If necessary, further layers of the descriptors are downloaded by the MRE 40, e.g., by the description data stream acquirer 1050.

FIG. 11B illustrates operations in an alternative embodiment where the descriptors are maintained at a server. FIG. 11B will be described along with FIG. 10 in accordance with an embodiment of the invention.

In this embodiment, only manifest and index files are acquired (step 1110) at the manifest & index files acquirer 1010 and extracted (step 1160) at the manifest & index files extractor 1020.

An interaction data extractor 1070 extracts and packages the interaction data (Step 1180) and sends to the server (Step 1190), which may be the video server 10 (FIG. 1) or a local, network, or cloud server, for processing and rendering a description data stream to the media player.

Another important component of the MRE is the menu generator 1080. Once the manifest file is received, it is processed. The menu, such as the navigational box 170 (FIG. 2), content box 200 (FIG. 3), and the pop-up menu 630 (FIG. 6B), is generated at the MRE 40 from the information in the manifest file.

Figure 12:
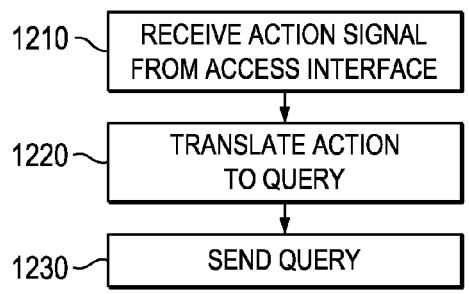
FIG. 12 illustrates operations within the query generation engine in accordance with an embodiment of the invention.

FIG. 12 illustrates operations within the query generation engine (QGE 70) in accordance with an embodiment of the invention.

In some applications, the navigable media grants accessibility to information associated with some or all objects, regions, scenes, and stories within the media. In one or more embodiments, such associated information may be retrieved from the web instead of the description data stream.

In various embodiments, the QGE 70 facilitates the query generation via the MRE interface. The QGE 70 extracts the actions taken by the accessing point of the interface (Step 1210), translates them into a query Q of n dimensional tuple (Step 1220), and sends them to the QME 80 (Step 1230).

Figure 13:
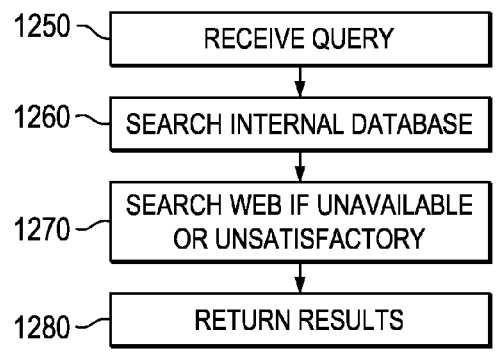
FIG. 13 illustrates operations within the query mapping engine in accordance with an embodiment of the invention.

FIG. 13 illustrates operations within the query mapping engine (QME 80) in accordance with an embodiment of the invention. The QME 80 receives the query Q from the QGE 70 (Step 1250) and searches the internal database (Step 1260). If the answer to the query is not available within the internal data base or if the obtained results are unsatisfactory based on a predefined metric, the QME 80 searches the web (Step 1270). The QME 80 returns the results to the MRE 40 either directly or through the MGE 20 or MDE 30 so that the associated content is rendered to the display of the media player (Step 1280).

Figure 14:
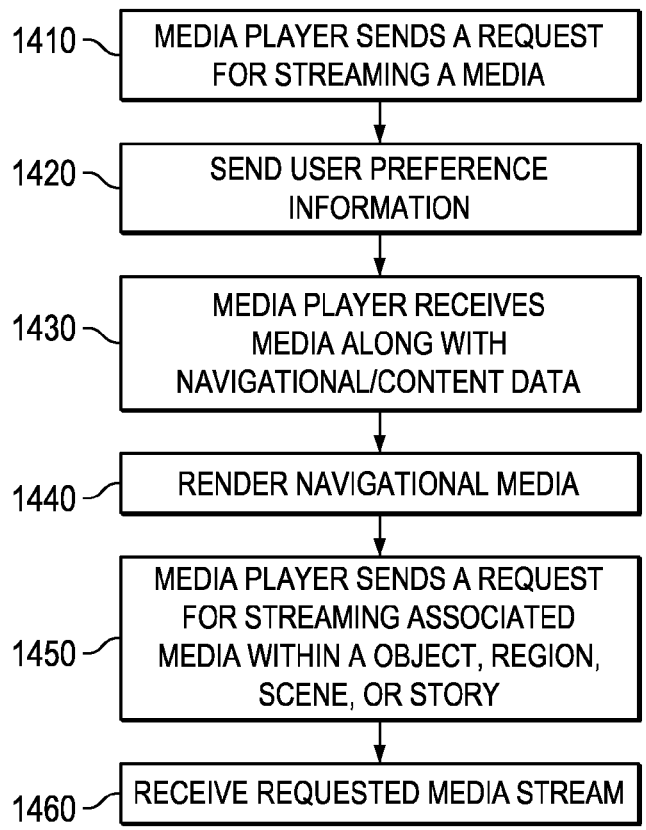
FIG. 14 illustrates operations in accordance with an embodiment of the invention for rendering media as described with respect to FIGS. 2-4 and/or FIGS. 6-13.

FIG. 14 illustrates operations in accordance with an embodiment of the invention for rendering media as described with respect to FIGS. 2-4 and/or FIGS. 6-13.

Referring to FIG. 14, a client, e.g., media player sends a request for streaming a media (Step 1410). The media player may optionally also send further user information such as a user preference information (Step 1420). The media player receives media along with navigational and content data (Step 1430), which is rendered to the display (Step 1440)

The media player may send another request for streaming by selecting an object, a region, a scene, or a story within the media while the media is playing, for example, as illustrated in FIG. 6 (Step 1450). Alternatively, the media player may send another request for streaming by selecting associated content (e.g., from the content box 200 in FIGS. 3, 4 or the navigational box 170 in FIG. 2).

The requested media stream is received at the media player (Step 1460), for example, after processing at the MGE 20, the MDE 30, and MRE 40 as described previously. In various embodiments, this requested media may be available at the local server 100, the video server 10, or the cloud.

Figure 15:
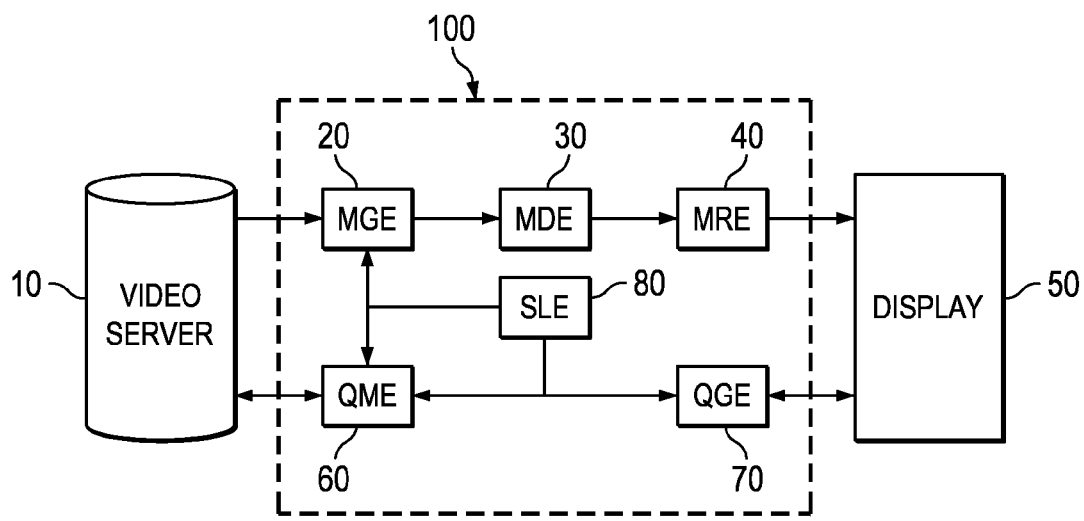
FIG. 15 illustrates an alternative embodiment of the navigational system.

FIG. 15 illustrates an alternative embodiment of the navigational system.

This embodiment is similar to the embodiment of FIG. 1. However, unlike FIG. 1, this embodiment includes a smart learning engine (SLE 80). The SLE 80 is configured to learn user preferences based on the navigation of the user over time. The SLE 80 communicates this information to the MGE 20, which adds the generated user information to the existing user preferences or replaces the user preferences.

Figure 16:
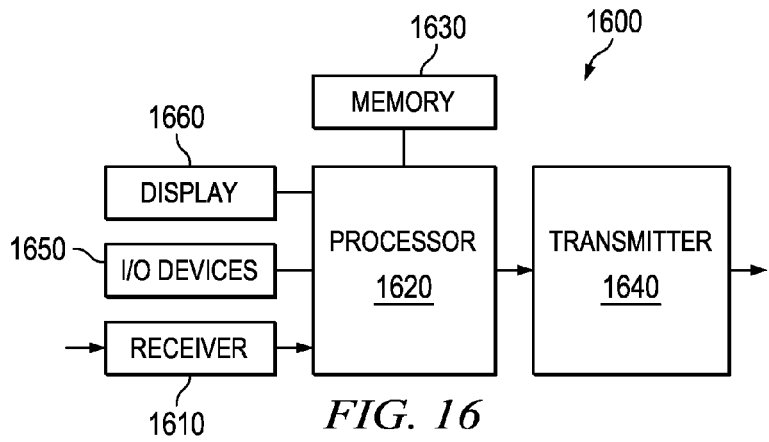
FIG. 16 illustrates a representative navigation system in accordance with embodiments of the invention.

FIG. 16 illustrates a representative navigation system in accordance with embodiments of the invention.

The navigation system 1600 includes a receiver 1610, which may include a wireless antenna receiver and/or a wired network connection port for receiving the media content, for example, if it is stored at a remote location. The navigation system 1600 also includes a memory 1630, which may include both a non-volatile memory and a volatile memory. In one embodiment, instructions for performing the operations described with respect to FIGS. 2-5, 6-7, 9, and 11-13 may be stored in a non-transitory storage medium such as a magnetic storage medium or a solid state storage medium in the memory 1630.

The navigation system 1600 may include further I/O devices 1650 for inputting and outputting data. For example, the I/O devices 1650 may include an optical disc such as a laser readable medium, for example, a compact disc reader, a blue ray disk reader, and/or digital video reader etc. In one or more embodiments, the instructions for performing the operations as described in FIGS. 2-5, 6-7, 9, and 11-13 may be stored in an optical disc, which is a non-transitory storage medium.

The navigational system 1600 may also include a display 1660 and a transmitter 1640 for transmitting the various data including the media and the descriptors. The transmitter 1640 may include plurality of wireless antennas and/or a wired port. The transmitter 1640 and the receiver 1610 may be combined together in some embodiments.

The navigational system 1600 includes a processor 1620 configured to execute the instructions for performing the operations described with respect to FIGS. 2-5, 6-7, 9, and 11-13. The processor 1620 may comprise a single processor or a plurality of processors. In one or more embodiments, the processor 1620 may perform the functions of each of the units described in FIGS. 1, 8, 10, and 15 sequentially or in parallel. For example, the processor 1620 may behave as the MGE 20 and then the MDE 30 and so on.

Figure 17:
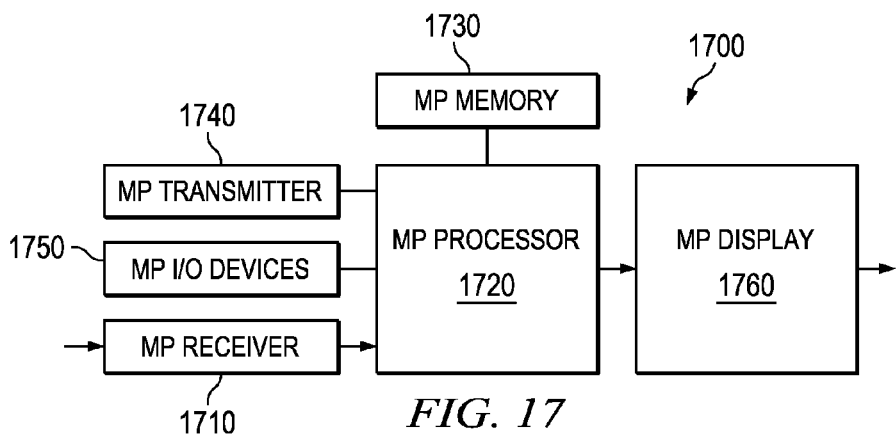
FIG. 17 illustrates a representative a media player in accordance with embodiments of the invention.

FIG. 17 illustrates a representative a media player in accordance with embodiments of the invention.

The media player 1700 includes a media player (MP) receiver 1710, which may include a wireless antenna receiver and/or a wired network connection port for receiving the media content, for example, if it is stored at a remote location. The MP receiver 1710 may be used by the media player 1700 to receive the media stream as well as the manifest, index, descriptor data files.

The media player 1700 also includes a MP memory 1730, which may include both a non-volatile memory and a volatile memory. In one embodiment, instructions for performing some or all of the operations described with respect to FIGS. 2-5, 6-7, 9, 11-14 may be stored in a non-transitory storage medium such as a magnetic storage medium or a solid state storage medium in the MP memory 1730.

The media player 1700 may include further MP I/O devices 1750 for inputting and outputting data. For example, the MP I/O devices 1750 may include an optical disc such as a laser readable medium, for example, a compact disc reader, a blue ray disk reader, and/or digital video reader etc. In one or more embodiments, the instructions for performing the operations as described in FIGS. 2-5, 6-7, 9, 11-14 may be stored in an optical disc, which is a non-transitory storage medium.

The media player 1700 may also include a MP display 1760 and a MP transmitter 1740 for transmitting the user specified parameter data. The MP transmitter 1740 may include plurality of wireless antennas and/or a wired port. The MP transmitter 1740 and the MP receiver 1710 can be combined together in some embodiments.

The media player 1700 includes a MP processor 1720 configured to execute the instructions for performing the operations described with respect to FIGS. 2-5, 6-7, 9, and 11-14. The MP processor 1720 may comprise a single processor or a plurality of processors. In one or more embodiments, the MP processor 1720 may perform one or more of the functions of the units described in FIGS. 1, 8, 10, and 15 sequentially or in parallel.

Figure 18:
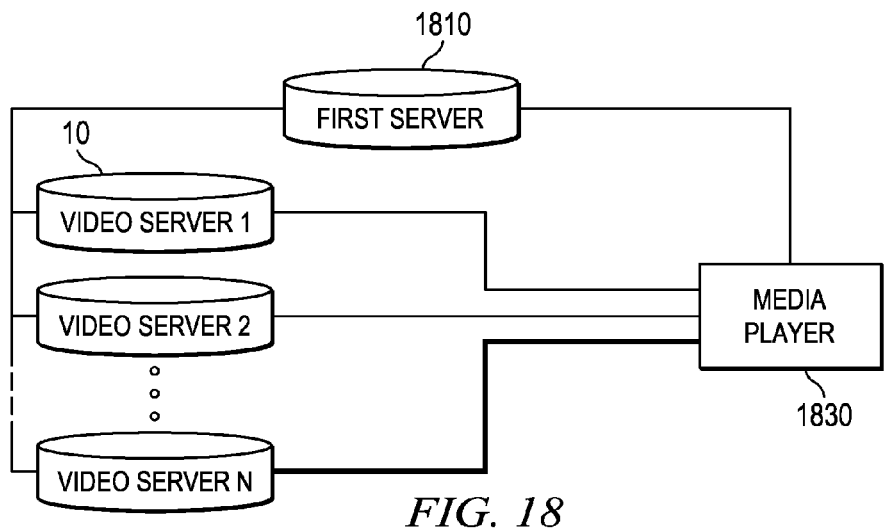
FIG. 18 illustrates a generic architecture of a system implementing the spatial and temporal navigational system in accordance with embodiments of the invention.

FIG. 18 illustrates a generic architecture of a system implementing the spatial and temporal navigational system in accordance with embodiments of the invention.

Referring to FIG. 18, a plurality of video servers 1820 may be serving a media stream to a client 1830. Upon request, a first server 1810 may serve the client 1830 with a navigable media stream. In various embodiments, the first server 1810 may be a standalone server or may be part of a video server 1820.

Embodiments of the invention enable and advance augmented reality in which videos are often specially created in a way to allow navigation through a specific geographic location. Offering in-depth navigation capability to media content as described in various embodiments (e.g., FIG. 6) is one way to provide these advanced features and service capabilities to enhance the end user experience.

As another example, a user selects an object, for instance, a star football player in an on-demand monday night football game. A navigable media player as described above in various embodiments may help the user to navigate through the scene or story by highlighting and tracking the star, generating a summary of highlighted scenes with the specific star being active in the scene, and creating a story board that highlights the moments of the star in the game. For example, the star may be identified as an object during the media generation by the MGE 20 (FIG. 1). Alternatively, the star is assigned to be an object because of the user selection or preference. Thus, a user may be able to watch only the moves of the star player without having to watch the whole game.

As yet another example, a user watching a cooking show may use navigable media to watch a shortened review of a recipe. After the show, the user may like to review a particular recipe and the cooking steps without a playback of the entire video. The user clicks on a navigation menu and selects cooking step quick review. A shortened version of the video now plays on the screen. The portions of the video that discuss the cooking steps are played back while skipping the other segments. In one embodiment, the recipe may appear on the screen during the playback and pause for several seconds so that the user captures the recipe. If the user is not familiar with one of the ingredients, she may click on the ingredient and select the type of information she seeks from a drop down menu. A new window may appear displaying a zoomed image of the selected ingredient to let the user have a closer look. With another click, detailed description about that ingredient may appear. Afterwards, a list of local retailers carrying the ingredient along with the price may be displayed with a third click. The user may also be interested in getting more recipes from the same chief. By clicking on the specific object of interest—the chief, related information may appear on the player for the user to browse.

In yet another scenario, the user may be interested in one of the dresses in a video. The user may click on the dress or highlight the dress within the video. The dress may be previously defined e.g., as an object, and thus a detailed description may appear on the screen. Alternatively, the dress may be defined to be an object by the highlighting and a query is sent to provide further information regarding the dress. Using a drop down menu or input some search criteria, a list of pictures of similar dresses may appear on the display. By clicking on one of the pictures, the user may obtain information about the store that sells that dress along with other features such as the sale price, etc. Using another navigation tool, the user may also get a 3D synthetic view of the dress or even try it out virtually. For music lovers, a navigation window may appear with just a simple click for the user to check details of the music or song playing in the video. A drop down menu may help the user to easily find more information relating to the music. In various embodiments, the present invention may facilitate these and many other navigational media.

In various embodiments, media may include any audio and/or video including animations or other motion picture type of multi-media content. Similarly, in various embodiments, content information includes metadata, which is information/data about or description of the media.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. As an illustration, the embodiments described in FIG. 2-4 may be combined with the embodiments described in FIG. 6-7. It is therefore intended that the appended claims encompass any such modifications or embodiments.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of playing media, the method comprising:
receiving content information that provides a plurality of options to consume the media, wherein the media is previously generated, wherein the content information comprises information relating to contextual, spatial, or temporal features of the media, wherein receiving the content information comprises:

receiving an index file describing a structure of the contextual, spatial, or temporal features within the media, receiving a descriptor data file comprising descriptors for the contextual, spatial, or temporal features, the descriptor data file being received sequentially using a multiple layered scheme, and receiving a manifest file comprising description of the descriptor data file;

displaying the content information of a media player;

sending a request to stream the media based on one option selected from the plurality of options;

receiving a first media stream; and displaying the first media stream, the first media stream being displayed in accordance with the selected option.

2. The method of claim 1, further comprising:

displaying a second media stream before sending the request to stream the media; and stopping the second media stream after receiving the first media stream.

3. The method of claim 2, wherein the content information is displayed outside a player main window displaying the first media stream.

4. The method of claim 1, wherein the content information comprises information for objects, regions, scenes, or stories within the media.

5. The method of claim 4, wherein the objects comprise people, things, and animals.

6. The method of claim 1, wherein the content information is displayed in a play control box.

7. The method of claim 1, wherein sending the request to stream the media comprises sending the request to stream the media based on a selection from a clickable option.

8. The method of claim 1, wherein the plurality of options for consuming the media comprises an option selected from the group consisting of highlight based media consumption, summary based media consumption, object based media consumption, scene based media consumption, and heat map based media consumption.

9. The method of claim 8, wherein the plurality of options further comprises an option selected from the group consisting of video frame rate, video resolution, audio bit depth, audio bit rate, and audio channels.

10. The method of claim 1, wherein the plurality of options for consuming the media comprises highlight and heat map based media consumption.

11. The method of claim 1, wherein the content information comprises information relating to temporal portions of the media stream.

12. The method of claim 1, wherein the content information comprises information relating to spatial portions of the media stream.

13. The method of claim 1, wherein the plurality of options of consuming the media comprises consuming additional media related to temporal portions of the media stream.

14. The method of claim 13, wherein the additional media comprise a media selected from the group consisting of cutout scenes, related interviews, critiques, synopsis, editorials, ratings, and reviews.

15. The method of claim 1, wherein the first media stream comprises navigable parts configured to be selected for further streaming.

16. The method of claim 15, further comprising:

sending a request to stream a selected navigable part of the first media stream;

receiving a second media stream with the selected navigable part; and displaying the second media stream, wherein a resolution of the selected navigable part in the second media stream is higher than a resolution of the selected navigable part in the first media stream.

17. An apparatus for playing media, the apparatus comprising:

an interface comprising a receiver and a transmitter, the receiver comprising at least one of: wireless antennas and wired ports, the receiver configured to receive content information that provides a plurality of options to consume the media, wherein the media is previously generated, wherein the content information comprises information relating to contextual, spatial, or temporal features of the media; and the transmitter comprising at least one of: wireless antennas and wired ports; and a processor coupled to the interface and coupled to a display, the processor operable to execute instructions that display the content information of a media player;

the transmitter configured to send a request to stream the media based on one option selected from the plurality of options, wherein the receiver is further configured to receive a media stream, and wherein the processor is further operable to execute instructions that display the media stream in accordance with the selected option, wherein the receiver is configured to receive an index file describing a structure of the contextual, spatial, or temporal features within the media, wherein the receiver is configured to receive a descriptor data file comprising descriptors for the contextual, spatial, or temporal features, wherein the descriptor data file is received sequentially using a multiple layered scheme, and wherein the receiver is configured to receive a manifest file comprising description of the descriptor data file.

18. The apparatus of claim 17, wherein the content information comprises information for objects, regions, scenes, or stories within the media.

19. The apparatus of claim 18, wherein the objects comprise people, things, and animals.

20. The apparatus of claim 17, wherein the display is further configured to display the content information outside a player main window displaying the media stream.

21. The apparatus of claim 17, wherein the display is further configured to display the content information in a play control box.

22. A method of displaying media, the method comprising:

receiving a request to stream a media, wherein the media is previously generated;

generating content information providing a plurality of presentation options to consume the media, wherein the content information comprises information relating to contextual, spatial, or temporal features of the media, wherein generating the content information comprises:

generating the contextual, spatial, or temporal features within the media, generating a descriptor data file comprising descriptors for the contextual, spatial, or temporal features, generating an index file describing a structure of the contextual, spatial, or temporal features, and generating a manifest file comprising a description of the descriptor data file;

sending the content information, wherein sending the content information comprises:

sending the manifest file and the index file, and sending the descriptor data file sequentially using a multiple layered scheme;

receiving a selected presentation option from amongst the plurality of presentation options; and generating a first media stream comprising the media based on the selected presentation option.

23. The method of claim 22, wherein sending the content information comprises sending the content information along with a second media stream.

24. The method of claim 22, further comprising sending the first media stream.

25. The method of claim 22, wherein the plurality of presentation options for consuming the media comprises a presentation option selected from the group consisting of highlight based media consumption, summary based media consumption, object based media consumption, scene based media consumption, and heat map based media consumption.

26. The method of claim 25, wherein the plurality of presentation options further comprises a presentation option selected from the group consisting of video frame rate, video resolution, audio bit depth, audio bit rate, and audio channels.

27. The method of claim 22, wherein the plurality of presentation options comprises highlight and heat map based media consumption.

28. The method of claim 22, wherein the content information comprises information relating to temporal portions of the first media stream.

29. The method of claim 22, wherein the content information comprises information relating to spatial portions of the first media stream.

30. An apparatus for streaming a media, the apparatus comprising:

an interface comprising a receiver and a transmitter, the receiver comprising at least one of: wireless antennas and wired ports, the receiver configured to receive a request to stream a media, where the media is previously generated; and the transmitter comprising at least one of: wireless antennas and wired ports;

a processor coupled to the interface, the processor operable to:

generate content information providing a plurality of presentation options to consume the media, wherein the content information comprises information relating to contextual, spatial, or temporal features of the media;

generate the contextual, spatial, or temporal features within the media;

generate a descriptor data file comprising descriptors for the contextual, spatial, or temporal features;

generate an index file describing a structure of the contextual, spatial, or temporal features; and generate a manifest file comprising a description of the descriptor data file; and wherein the transmitter is configured to send the content information, the manifest file and the index file, wherein the transmitter is further configured to send the descriptor data file sequentially using a multiple layered scheme, wherein the receiver is further configured to receive a selected presentation option from amongst the plurality of presentation options, and wherein the processor is further operable to generate a first media stream comprising the media based on the selected presentation option.

* * * * *